United States Patent
Kuo et al.

(10) Patent No.: US 10,036,975 B1
(45) Date of Patent: Jul. 31, 2018

(54) DETERMINING A PULSE TIMING FUNCTION FOR A LINEAR PRINTHEAD

(71) Applicant: Eastman Kodak Company, Rochester, NY (US)

(72) Inventors: Chung-Hui Kuo, Fairport, NY (US); David R. Brent, Walworth, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 15/635,560

(22) Filed: Jun. 28, 2017

(51) Int. Cl.
*G03G 15/043* (2006.01)
*H04N 1/40* (2006.01)
*H04N 1/29* (2006.01)
*G06K 15/02* (2006.01)

(52) U.S. Cl.
CPC ......... *G03G 15/043* (2013.01); *G06K 15/027* (2013.01); *H04N 1/29* (2013.01); *H04N 1/40031* (2013.01); *H04N 2201/0094* (2013.01)

(58) Field of Classification Search
CPC ...... G03G 15/043; G06K 15/027; H04N 1/29; H04N 1/295; H04N 1/40025; H04N 1/40031
See application file for complete search history.

(56) References Cited

U.S. PATENT DOCUMENTS

| | | | |
|---|---|---|---|
| 6,086,441 A | 7/2000 | Akiguchi et al. | |
| 6,452,696 B1 | 9/2002 | Bogart et al. | |
| 6,554,388 B1 | 4/2003 | Wong et al. | |
| 7,038,816 B2 | 5/2006 | Klassen et al. | |
| 7,058,325 B2 | 6/2006 | Hamby et al. | |
| 7,079,281 B1 | 7/2006 | Ng et al. | |
| 7,079,287 B1 | 7/2006 | Ng et al. | |
| 7,564,475 B1 | 7/2009 | Mizes | |
| 7,663,654 B2 | 2/2010 | Arai et al. | |
| 7,830,569 B2 | 11/2010 | Tai et al. | |
| 8,493,623 B2 | 7/2013 | Tai et al. | |
| 8,559,061 B2 | 10/2013 | Dobbertin et al. | |
| 8,824,907 B2 | 9/2014 | Kuo et al. | |
| 9,147,232 B1 | 9/2015 | Kuo | |
| 9,565,337 B1 | 2/2017 | Kuo et al. | |
| 2005/0036705 A1 | 2/2005 | Viassolo et al. | |
| 2005/0062831 A1* | 3/2005 | Ishibashi | G06K 15/1209 347/142 |
| 2005/0134624 A1 | 6/2005 | Mizes | |
| 2006/0133870 A1 | 6/2006 | Ng et al. | |

(Continued)

*Primary Examiner* — Carla Therrien
(74) *Attorney, Agent, or Firm* — Kevin E. Spaulding

(57) ABSTRACT

A method is described for controlling a printhead including an array of light sources. An aim exposure function is provided which gives an aim exposure as a function of an integer pulse count. An initial pulse timing function is also provided which defines an exposure time as a function of pulse count. A light output function for the light sources is determined responsive to the pulse timing function, wherein the light output function gives a light output of the light sources as a function of exposure time. The pulse timing function is updated responsive to the light output function and the aim exposure function. The process is repeated until a predefined iteration termination criterion is satisfied. The determined pulse timing function is used to control the printhead, wherein each light source is activated for a pulse count corresponding to a pixel code value of an associated image pixel.

14 Claims, 20 Drawing Sheets

(56) References Cited

U.S. PATENT DOCUMENTS

| | | |
|---|---|---|
| 2007/0211913 A1 | 9/2007 | Washio et al. |
| 2008/0042045 A1* | 2/2008 | Miyazawa ............... G09G 3/20 250/205 |
| 2008/0226361 A1 | 9/2008 | Tomita et al. |
| 2010/0097657 A1 | 4/2010 | Tai et al. |
| 2016/0085172 A1* | 3/2016 | Horiuchi .......... G03G 15/04072 347/118 |

* cited by examiner

DETERMINING A PULSE TIMING FUNCTION FOR A LINEAR PRINTHEAD

CROSS-REFERENCE TO RELATED APPLICATIONS

Reference is made to commonly assigned, co-pending U.S. patent application Ser. No. 15/635,520, entitled: "Adaptive printhead calibration process," by Kuo et al.; and to commonly assigned, co-pending U.S. patent application Ser. No. 15/635,596, entitled: "Print engine with print-mode-dependent pulse timing functions," by Kuo et al., each of which is incorporated herein by reference.

FIELD OF THE INVENTION

This invention pertains to the field of electrographic printing and more particularly to a method for determining a pulse timing function for controlling a linear printhead.

BACKGROUND OF THE INVENTION

Electrophotography is a useful process for printing images on a receiver (or "imaging substrate"), such as a piece or sheet of paper or another planar medium (e.g., glass, fabric, metal, or other objects) as will be described below. In this process, an electrostatic latent image is formed on a photoreceptor by uniformly charging the photoreceptor and then discharging selected areas of the uniform charge to yield an electrostatic charge pattern corresponding to the desired image (i.e., a "latent image").

After the latent image is formed, charged toner particles are brought into the vicinity of the photoreceptor and are attracted to the latent image to develop the latent image into a toner image. Note that the toner image may not be visible to the naked eye depending on the composition of the toner particles (e.g., clear toner).

After the latent image is developed into a toner image on the photoreceptor, a suitable receiver is brought into juxtaposition with the toner image. A suitable electric field is applied to transfer the toner particles of the toner image to the receiver to form the desired print image on the receiver. The imaging process is typically repeated many times with reusable photoreceptors.

The receiver is then removed from its operative association with the photoreceptor and subjected to heat or pressure to permanently fix (i.e., "fuse") the print image to the receiver. Plural print images (e.g., separation images of different colors) can be overlaid on the receiver before fusing to form a multicolor print image on the receiver.

Typically, a linear printhead including an array of LED light sources is used to form the electrostatic latent image. Differences between the power provided by the individual light sources can result in streak artifacts being formed in the printed image. Even if the printhead is carefully calibrated in the factory to equalize the power provided by each light source, it has been found that when the printhead is installed into a printing system that there can be residual streak artifacts, and that these artifacts can change with time. Therefore, there remains a need for a method that can be performed in the field to calibrate the printhead to equalize the exposure provided by each light source.

Typically, a linear printhead including an array of LED light sources is used to form the electrostatic latent image. The printhead generally has an 8-bit interface which enables 256 different exposure levels to be provided by each of the light sources. The exposure level provided by the light sources is typically controlled by adjusting a time that the light sources are activated, where each of the pixel code values is mapped to an exposure time that provides an aim exposure level.

To control the exposure time, some printheads utilize a stream of exposure clock pulses having non-uniform pulse widths, where the pulse widths are selected to provide the aim exposure levels. The exposure time for a particular pixel is controlled by counting a number of exposure clock pulses corresponding to the pixel code value. For example, for a pixel code value of 100, the light source would be activated for 100 exposure clock pulses. However, it has been found that the optical power provided by the light sources is not constant with time, and that the shape of the light output function is a function of the pulse widths of the exposure clock pulses. Therefore, determining the pulses widths required to provide the desired aim exposures can be a complex process because changing the pulse width to modify the exposure time changes the power, which will in turn affect the exposure time required to provide the aim exposure. In some printing systems, the aim exposure level as a function of pixel code value may be updated in the field as part of a printer calibration process. It is therefore necessary to update the pulse widths of the exposure clock pulses accordingly. There remains a need for an efficient method for determining a pulse timing function that can be implemented in the field, and for controlling the printer with a pulse timing function appropriate for a particular print mode.

SUMMARY OF THE INVENTION

The present invention represents a method for controlling a printhead in a digital printing system, the printhead including an array of light sources for exposing a photosensitive medium, including:

a) providing an aim exposure function which gives an aim exposure to be provided by the light sources as a function of an integer pulse count;

b) providing an initial pulse timing function which defines an exposure time as a function of pulse count;

c) determining a light output function for the light sources responsive to the pulse timing function, wherein the light output function gives a light output of the light sources as a function of exposure time;

d) updating the pulse timing function responsive to the light output function and the aim exposure function;

e) repeating steps c)-d) until a predefined iteration termination criterion is satisfied; and f) using the pulse timing function to control the printhead, wherein each light source is activated for a pulse count corresponding to a pixel code value of an associated image pixel.

This invention has the advantage that a pulse timing function can be determined that will provide a specified aim exposure function for printheads where the light output function varies with changes in the pulse timing function.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
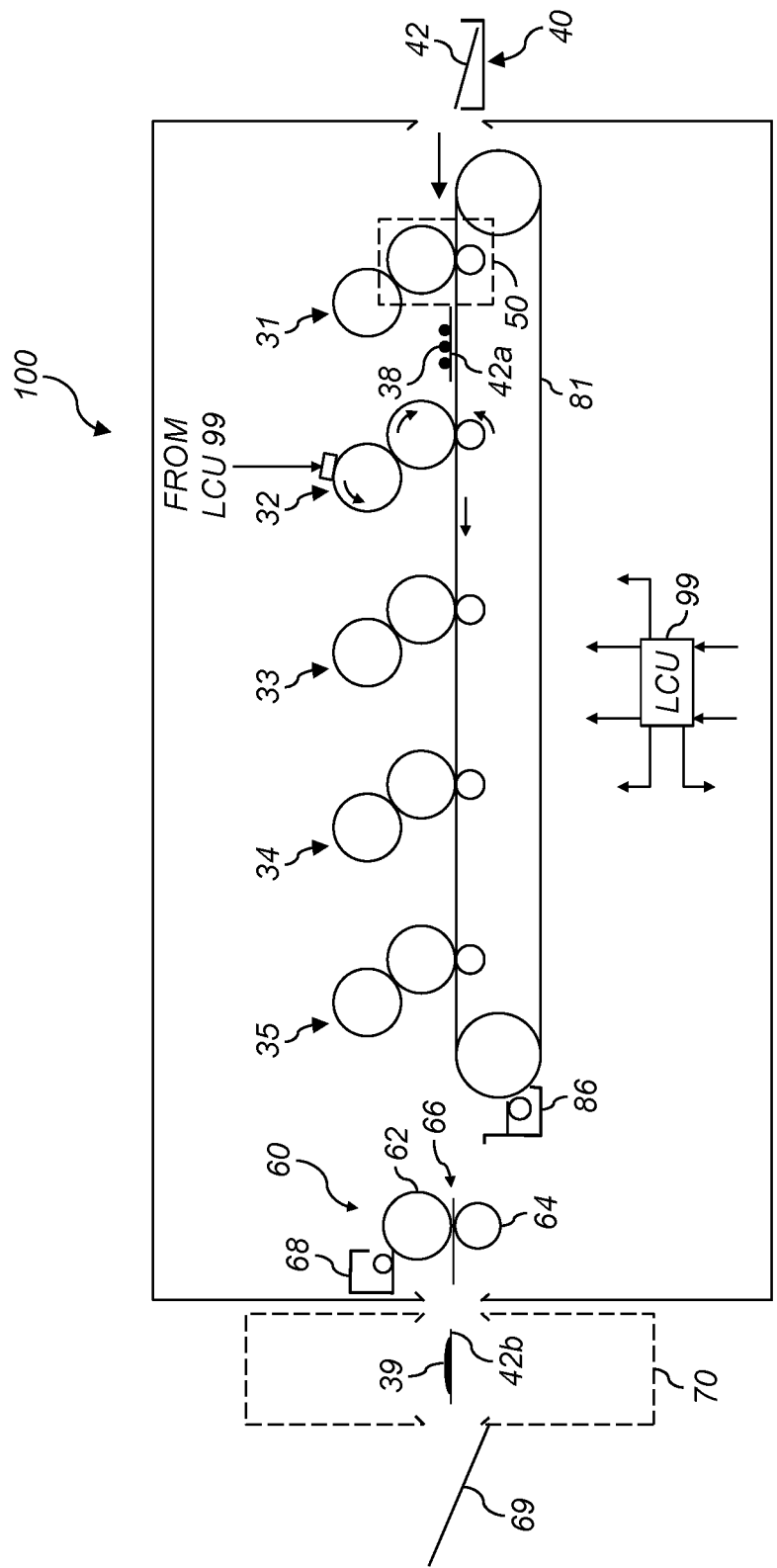
FIG. 1 is an elevational cross-section of an electrophotographic printer suitable for use with various embodiments.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated, or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

As used herein, "sheet" is a discrete piece of media, such as receiver media for an electrophotographic printer (described below). Sheets have a length and a width. Sheets are folded along fold axes (e.g., positioned in the center of the sheet in the length dimension, and extending the full width of the sheet). The folded sheet contains two "leaves," each leaf being that portion of the sheet on one side of the fold axis. The two sides of each leaf are referred to as "pages." "Face" refers to one side of the sheet, whether before or after folding.

As used herein, "toner particles" are particles of one or more material(s) that are transferred by an electrophotographic (EP) printer to a receiver to produce a desired effect or structure (e.g., a print image, texture, pattern, or coating) on the receiver. Toner particles can be ground from larger solids, or chemically prepared (e.g., precipitated from a solution of a pigment and a dispersant using an organic solvent), as is known in the art. Toner particles can have a range of diameters (e.g., less than 8 µm, on the order of 10-15 µm, up to approximately 30 µm, or larger), where "diameter" preferably refers to the volume-weighted median diameter, as determined by a device such as a Coulter Multisizer. When practicing this invention, it is preferable to use larger toner particles (i.e., those having diameters of at least 20 µm) in order to obtain the desirable toner stack heights that would enable macroscopic toner relief structures to be formed.

"Toner" refers to a material or mixture that contains toner particles, and that can be used to form an image, pattern, or coating when deposited on an imaging member including a photoreceptor, a photoconductor, or an electrostatically-charged or magnetic surface. Toner can be transferred from the imaging member to a receiver. Toner is also referred to in the art as marking particles, dry ink, or developer, but note that herein "developer" is used differently, as described below. Toner can be a dry mixture of particles or a suspension of particles in a liquid toner base.

As mentioned already, toner includes toner particles; it can also include other types of particles. The particles in toner can be of various types and have various properties. Such properties can include absorption of incident electromagnetic radiation (e.g., particles containing colorants such as dyes or pigments), absorption of moisture or gasses (e.g., desiccants or getters), suppression of bacterial growth (e.g., biocides, particularly useful in liquid-toner systems), adhesion to the receiver (e.g., binders), electrical conductivity or low magnetic reluctance (e.g., metal particles), electrical resistivity, texture, gloss, magnetic remanence, florescence, resistance to etchants, and other properties of additives known in the art.

In single-component or mono-component development systems, "developer" refers to toner alone. In these systems, none, some, or all of the particles in the toner can themselves be magnetic. However, developer in a mono-component system does not include magnetic carrier particles. In dual-component, two-component, or multi-component development systems, "developer" refers to a mixture including toner particles and magnetic carrier particles, which can be electrically-conductive or -non-conductive. Toner particles can be magnetic or non-magnetic. The carrier particles can be larger than the toner particles (e.g., 15-µm or 20-300 µm in diameter). A magnetic field is used to move the developer in these systems by exerting a force on the magnetic carrier particles. The developer is moved into proximity with an imaging member or transfer member by the magnetic field, and the toner or toner particles in the developer are transferred from the developer to the member by an electric field, as will be described further below. The magnetic carrier particles are not intentionally deposited on the member by action of the electric field; only the toner is intentionally deposited. However, magnetic carrier particles, and other particles in the toner or developer, can be unintentionally transferred to an imaging member. Developer can include other additives known in the art, such as those listed above for toner. Toner and carrier particles can be substantially spherical or non-spherical.

The electrophotographic process can be embodied in devices including printers, copiers, scanners, and facsimiles, and analog or digital devices, all of which are referred to herein as "printers." Various embodiments described herein are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields). The present invention can be practiced using any type of electrographic printing system, including electrophotographic and ionographic printers.

A digital reproduction printing system ("printer") typically includes a digital front-end processor (DFE), a print engine (also referred to in the art as a "marking engine") for applying toner to the receiver, and one or more post-printing finishing system(s) (e.g., a UV coating system, a glosser system, or a laminator system). A printer can reproduce pleasing black-and-white or color images onto a receiver. A printer can also produce selected patterns of toner on a receiver, which patterns (e.g., surface textures) do not correspond directly to a visible image.

In an embodiment of an electrophotographic modular printing machine useful with various embodiments (e.g., the NEXPRESS SX 3900 printer manufactured by Eastman Kodak Company of Rochester, N.Y.) color-toner print images are made in a plurality of color imaging modules arranged in tandem, and the print images are successively electrostatically transferred to a receiver adhered to a transport web moving through the modules. Colored toners include colorants, (e.g., dyes or pigments) which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. The provision of a clear-toner overcoat to a color print is desirable for providing features such as protecting the print from fingerprints, reducing certain visual artifacts or providing desired texture or surface finish characteristics. Clear toner uses particles that are similar to the toner particles of the color development stations but without colored material (e.g., dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective color toners are deposited one upon the other at respective locations on the receiver and the height of a respective color toner stack is the sum of the toner heights of each respective color. Uniform stack height provides the print with a more even or uniform gloss.

Figure 2:
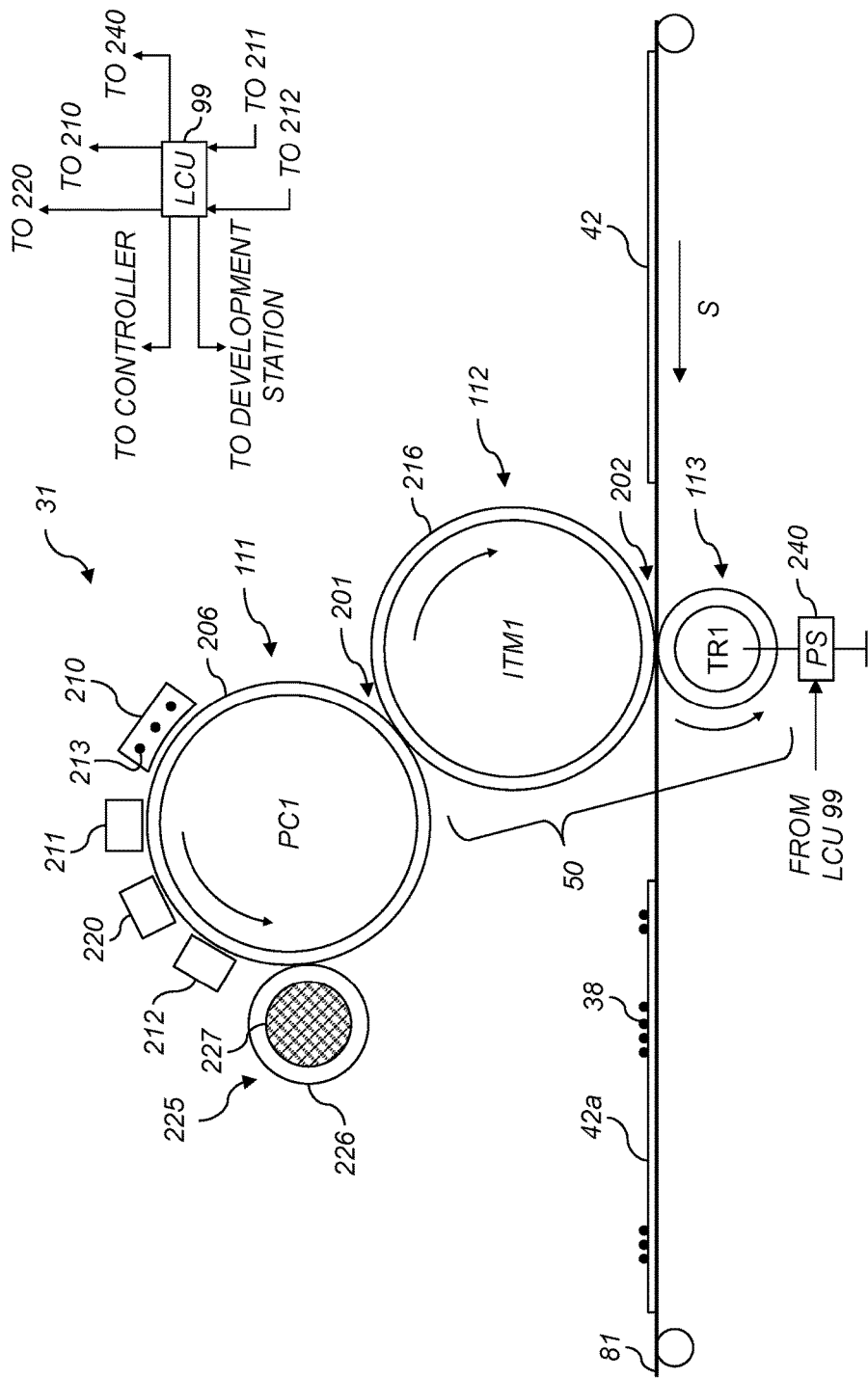
FIG. 2 is an elevational cross-section of one printing module of the electrophotographic printer of FIG. 1.

FIGS. 1 and 2 are elevational cross-sections showing portions of a typical electrophotographic printer 100 useful with various embodiments. Printer 100 is adapted to produce images, such as single-color images (i.e., monochrome images), or multicolor images such as CMYK, or pentachrome (five-color) images, on a receiver. Multicolor images are also known as "multi-component" images. One embodiment involves printing using an electrophotographic print engine having five sets of single-color image-producing or image-printing stations or modules arranged in tandem, but more or less than five colors can be combined on a single receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing subsystems 31, 32, 33, 34, 35, also known as electrophotographic imaging subsystems. Each printing subsystem 31, 32, 33, 34, 35 produces a single-color toner image for transfer using a respective transfer subsystem 50 (for clarity, only one is labeled) to a receiver 42 successively moved through the modules. In some embodiments one or more of the printing subsystem 31, 32, 33, 34, 35 can print a colorless toner image, which can be used to provide a protective overcoat or tactile image features. Receiver 42 is transported from supply unit 40, which can include active feeding subsystems as known in the art, into printer 100 using a transport web 81. In various embodiments, the visible image can be transferred directly from an imaging roller to a receiver, or from an imaging roller to one or more transfer roller(s) or belt(s) in sequence in transfer subsystem 50, and then to receiver 42. Receiver 42 is, for example, a selected section of a web or a cut sheet of a planar receiver media such as paper or transparency film.

In the illustrated embodiments, each receiver 42 can have up to five single-color toner images transferred in registration thereon during a single pass through the five printing subsystems 31, 32, 33, 34, 35 to form a pentachrome image. As used herein, the term "pentachrome" implies that in a print image, combinations of various of the five colors are combined to form other colors on the receiver at various locations on the receiver, and that all five colors participate to form process colors in at least some of the subsets. That is, each of the five colors of toner can be combined with toner of one or more of the other colors at a particular location on the receiver to form a color different than the colors of the toners combined at that location. In an exemplary embodiment, printing subsystem 31 forms black (K) print images, printing subsystem 32 forms yellow (Y) print images, printing subsystem 33 forms magenta (M) print images, and printing subsystem 34 forms cyan (C) print images.

Printing subsystem 35 can form a red, blue, green, or other fifth print image, including an image formed from a clear toner (e.g., one lacking pigment). The four subtractive primary colors, cyan, magenta, yellow, and black, can be combined in various combinations of subsets thereof to form a representative spectrum of colors. The color gamut of a printer (i.e., the range of colors that can be produced by the printer) is dependent upon the materials used and the process used for forming the colors. The fifth color can therefore be added to improve the color gamut. In addition to adding to the color gamut, the fifth color can also be a specialty color toner or spot color, such as for making proprietary logos or colors that cannot be produced with only CMYK colors (e.g., metallic, fluorescent, or pearlescent colors), or a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42a is shown after passing through printing subsystem 31. Print image 38 on receiver 42a includes unfused toner particles. Subsequent to transfer of the respective print images, overlaid in registration, one from each of the respective printing subsystems 31, 32, 33, 34, 35, receiver 42a is advanced to a fuser module 60 (i.e., a fusing or fixing assembly) to fuse the print image 38 to the receiver 42a. Transport web 81 transports the print-image-carrying receivers to the fuser module 60, which fixes the toner particles to the respective receivers, generally by the application of heat and pressure. The receivers are serially de-tacked from the transport web 81 to permit them to feed cleanly into the fuser module 60. The transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along the transport web 81 before or after cleaning station 86 in the direction of rotation of transport web 81.

In the illustrated embodiment, the fuser module 60 includes a heated fusing roller 62 and an opposing pressure roller 64 that form a fusing nip 66 therebetween. In an embodiment, fuser module 60 also includes a release fluid application substation 68 that applies release fluid, e.g., silicone oil, to fusing roller 62. Alternatively, wax-containing toner can be used without applying release fluid to the fusing roller 62. Other embodiments of fusers, both contact and non-contact, can be employed. For example, solvent fixing uses solvents to soften the toner particles so they bond with the receiver. Photoflash fusing uses short bursts of high-frequency electromagnetic radiation (e.g., ultraviolet light) to melt the toner. Radiant fixing uses lower-frequency electromagnetic radiation (e.g., infrared light) to more slowly melt the toner. Microwave fixing uses electromagnetic radiation in the microwave range to heat the receivers (primarily), thereby causing the toner particles to melt by heat conduction, so that the toner is fixed to the receiver.

The fused receivers (e.g., receiver 42b carrying fused image 39) are transported in series from the fuser module 60 along a path either to an output tray 69, or back to printing subsystems 31, 32, 33, 34, 35 to form an image on the backside of the receiver (i.e., to form a duplex print). Receivers 42b can also be transported to any suitable output accessory. For example, an auxiliary fuser or glossing assembly can provide a clear-toner overcoat. Printer 100 can also include multiple fuser modules 60 to support applications such as overprinting, as known in the art.

In various embodiments, between the fuser module 60 and the output tray 69, receiver 42b passes through a finisher 70. Finisher 70 performs various paper-handling operations, such as folding, stapling, saddle-stitching, collating, and binding.

Printer 100 includes main printer apparatus logic and control unit (LCU) 99, which receives input signals from various sensors associated with printer 100 and sends control signals to various components of printer 100. LCU 99 can include a microprocessor incorporating suitable look-up tables and control software executable by the LCU 99. It can also include a field-programmable gate array (FPGA), programmable logic device (PLD), programmable logic controller (PLC) (with a program in, e.g., ladder logic), microcontroller, or other digital control system. LCU 99 can include memory for storing control software and data. In some embodiments, sensors associated with the fuser module 60 provide appropriate signals to the LCU 99. In response to the sensor signals, the LCU 99 issues command and control signals that adjust the heat or pressure within fusing nip 66 and other operating parameters of fuser module 60. This permits printer 100 to print on receivers of various thicknesses and surface finishes, such as glossy or matte.

FIG. 2 shows additional details of printing subsystem 31, which is representative of printing subsystems 32, 33, 34, and 35 (FIG. 1). Photoreceptor 206 of imaging member 111 includes a photoconductive layer formed on an electrically conductive substrate. The photoconductive layer is an insulator in the substantial absence of light so that electric charges are retained on its surface. Upon exposure to light, the charge is dissipated. In various embodiments, photoreceptor 206 is part of, or disposed over, the surface of imaging member 111, which can be a plate, drum, or belt. Photoreceptors can include a homogeneous layer of a single material such as vitreous selenium or a composite layer containing a photoconductor and another material. Photoreceptors 206 can also contain multiple layers.

Charging subsystem 210 applies a uniform electrostatic charge to photoreceptor 206 of imaging member 111. In an exemplary embodiment, charging subsystem 210 includes a wire grid 213 having a selected voltage. Additional necessary components provided for control can be assembled about the various process elements of the respective printing subsystems. Meter 211 measures the uniform electrostatic charge provided by charging subsystem 210.

An exposure subsystem 220 is provided for selectively modulating the uniform electrostatic charge on photoreceptor 206 in an image-wise fashion by exposing photoreceptor 206 to electromagnetic radiation to form a latent electrostatic image. The uniformly-charged photoreceptor 206 is typically exposed to actinic radiation provided by selectively activating particular light sources in an LED array or a laser device outputting light directed onto photoreceptor 206. In embodiments using laser devices, a rotating polygon (not shown) is sometimes used to scan one or more laser beam(s) across the photoreceptor in the fast-scan direction. One pixel site is exposed at a time, and the intensity or duty cycle of the laser beam is varied at each dot site. In embodiments using an LED array, the array can include a plurality of LEDs arranged next to each other in a linear array extending in a cross-track direction such that all dot sites in one row of dot sites on the photoreceptor can be selectively exposed simultaneously, and the intensity or duty cycle of each LED can be varied within a line exposure time to expose each pixel site in the row during that line exposure time.

As used herein, an "engine pixel" is the smallest addressable unit on photoreceptor 206 which the exposure subsystem 220 (e.g., the laser or the LED) can expose with a selected exposure different from the exposure of another engine pixel. Engine pixels can overlap (e.g., to increase addressability in the slow-scan direction). Each engine pixel has a corresponding engine pixel location, and the exposure applied to the engine pixel location is described by an engine pixel level.

The exposure subsystem 220 can be a write-white or write-black system. In a write-white or "charged-area-development" system, the exposure dissipates charge on areas of photoreceptor 206 to which toner should not adhere. Toner particles are charged to be attracted to the charge remaining on photoreceptor 206. The exposed areas therefore correspond to white areas of a printed page. In a write-black or "discharged-area development" system, the toner is charged to be attracted to a bias voltage applied to photoreceptor 206 and repelled from the charge on photoreceptor 206. Therefore, toner adheres to areas where the charge on photoreceptor 206 has been dissipated by exposure. The exposed areas therefore correspond to black areas of a printed page.

In the illustrated embodiment, meter 212 is provided to measure the post-exposure surface potential within a patch area of a latent image formed from time to time in a non-image area on photoreceptor 206. Other meters and components can also be included (not shown).

A development station 225 includes toning shell 226, which can be rotating or stationary, for applying toner of a selected color to the latent image on photoreceptor 206 to produce a developed image on photoreceptor 206 corresponding to the color of toner deposited at this printing subsystem 31. Development station 225 is electrically biased by a suitable respective voltage to develop the respective latent image, which voltage can be supplied by a power supply (not shown). Developer is provided to toning shell 226 by a supply system (not shown) such as a supply roller, auger, or belt. Toner is transferred by electrostatic forces from development station 225 to photoreceptor 206. These forces can include Coulombic forces between charged toner particles and the charged electrostatic latent image, and Lorentz forces on the charged toner particles due to the electric field produced by the bias voltages.

In some embodiments, the development station 225 employs a two-component developer that includes toner particles and magnetic carrier particles. The exemplary development station 225 includes a magnetic core 227 to cause the magnetic carrier particles near toning shell 226 to form a "magnetic brush," as known in the electrophotographic art. Magnetic core 227 can be stationary or rotating, and can rotate with a speed and direction the same as or different than the speed and direction of toning shell 226. Magnetic core 227 can be cylindrical or non-cylindrical, and can include a single magnet or a plurality of magnets or magnetic poles disposed around the circumference of magnetic core 227. Alternatively, magnetic core 227 can include an array of solenoids driven to provide a magnetic field of alternating direction. Magnetic core 227 preferably provides a magnetic field of varying magnitude and direction around the outer circumference of toning shell 226. Development station 225 can also employ a mono-component developer comprising toner, either magnetic or non-magnetic, without separate magnetic carrier particles.

Transfer subsystem 50 includes transfer backup member 113, and intermediate transfer member 112 for transferring the respective print image from photoreceptor 206 of imaging member 111 through a first transfer nip 201 to surface 216 of intermediate transfer member 112, and thence to a receiver 42 which receives respective toned print images 38 from each printing subsystem in superposition to form a composite image thereon. The print image 38 is, for example, a separation of one color, such as cyan. Receiver 42 is transported by transport web 81. Transfer to a receiver is effected by an electrical field provided to transfer backup member 113 by power source 240, which is controlled by LCU 99. Receiver 42 can be any object or surface onto which toner can be transferred from imaging member 111 by application of the electric field. In this example, receiver 42 is shown prior to entry into a second transfer nip 202, and receiver 42a is shown subsequent to transfer of the print image 38 onto receiver 42a.

In the illustrated embodiment, the toner image is transferred from the photoreceptor 206 to the intermediate transfer member 112, and from there to the receiver 42. Registration of the separate toner images is achieved by registering the separate toner images on the receiver 42, as is done with the NexPress 2100. In some embodiments, a single transfer member is used to sequentially transfer toner images from each color channel to the receiver 42. In other embodiments, the separate toner images can be transferred in register directly from the photoreceptor 206 in the respective printing subsystem 31, 32, 33, 34, 25 to the receiver 42 without using a transfer member. Either transfer process is suitable when practicing this invention. An alternative method of transferring toner images involves transferring the separate toner images, in register, to a transfer member and then transferring the registered image to a receiver.

LCU 99 sends control signals to the charging subsystem 210, the exposure subsystem 220, and the respective development station 225 of each printing subsystem 31, 32, 33, 34, 35 (FIG. 1), among other components. Each printing subsystem can also have its own respective controller (not shown) coupled to LCU 99.

Various finishing systems can be used to apply features such as protection, glossing, or binding to the printed images. The finishing system scan be implemented as an integral components of the printer 100, or can include one or more separate machines through which the printed images are fed after they are printed.

Figure 3:
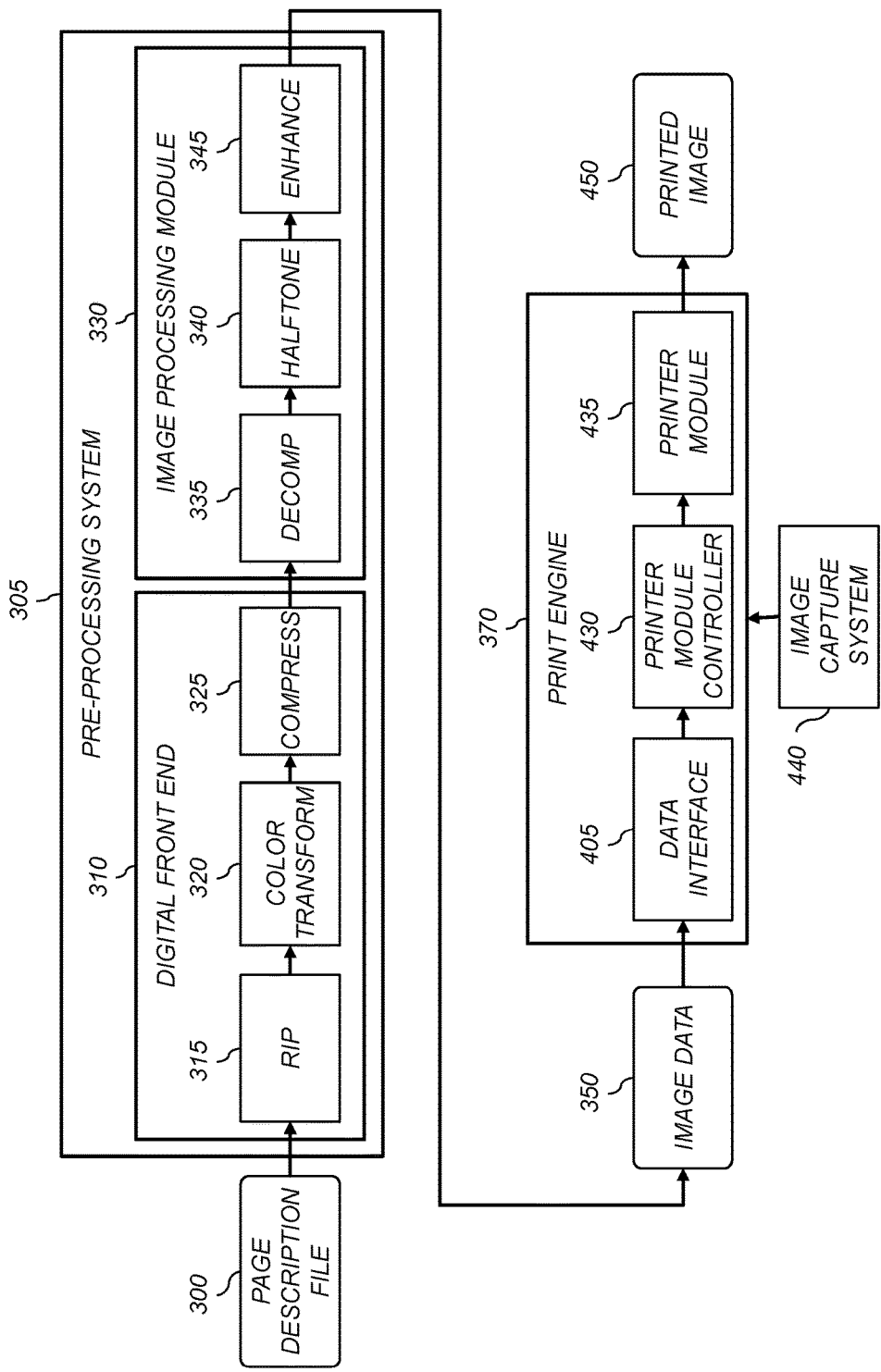
FIG. 3 shows a processing path for producing a printed image using a pre-processing system couple to a print engine.

FIG. 3 shows a processing path that can be used to produce a printed image 450 with a print engine 370 in accordance with embodiments of the invention. A pre-processing system 305 is used to process a page description file 300 to provide image data 350 that is in a form that is ready to be printed by the print engine 370. In an exemplary configuration, the pre-processing system 305 includes a digital front end (DFE) 310 and an image processing module 330. The pre-processing system 305 can be a part of printer 100 (FIG. 1), or may be a separate system which is remote from the printer 100. The DFE 310 and an image processing module 330 can each include one or more suitably-programmed computer or logic devices adapted to perform operations appropriate to provide the image data 350.

The DFE 310 receives page description files 300 which define the pages that are to be printed. The page description files 300 can be in any appropriate format (e.g., the well-known Postscript command file format or the PDF file format) that specifies the content of a page in terms of text, graphics and image objects. The image objects are typically provided by input devices such as scanners, digital cameras or computer generated graphics systems. The page description file 300 can also specify invisible content such as specifications of texture, gloss or protective coating patterns.

The DFE 310 rasterizes the page description file 300 into image bitmaps for the print engine to print. The DFE 310 can include various processors, such as a raster image processor (RIP) 315, a color transform processor 320 and a compression processor 325. It can also include other processors not shown in FIG. 3, such as an image positioning processor or an image storage processor. In some embodiments, the DFE 310 enables a human operator to set up parameters such as layout, font, color, media type or post-finishing options.

The RIP 315 rasterizes the objects in the page description file 300 into an image bitmap including an array of image pixels at an image resolution that is appropriate for the print engine 370. For text or graphics objects the RIP 315 will create the image bitmap based on the object definitions. For image objects, the RIP 315 will resample the image data to the desired image resolution.

The color transform processor 320 will transform the image data to the color space required by the print engine 370, providing color separations for each of the color channels (e.g., CMYK). For cases where the print engine 370 includes one or more additional colors (e.g., red, blue, green, gray or clear), the color transform processor 320 will also provide color separations for each of the additional color channels. The objects defined in the page description file 300 can be in any appropriate input color space such as RGB, CIELAB, PCS LAB or CMYK. In some cases, different objects may be defined using different color spaces. The color transform processor 320 applies an appropriate color transform to convert the objects to the device-dependent color space of the print engine 370. Methods for creating such color transforms are well-known in the color management art, and any such method can be used in accordance with the present invention. Typically, the color transforms are defined using color management profiles that include multi-dimensional look-up tables. Input color profiles are used to define a relationship between the input color space and a profile connection space (PCS) defined for a color management system (e.g., the well-known ICC PCS associated with the ICC color management system). Output color profiles define a relationship between the PCS and the device-dependent output color space for the printer 100. The color transform processor 320 transforms the image data using the color management profiles. Typically, the output of the color transform processor 320 will be a set of color separations including an array of pixels for each of the color channels of the print engine 370 stored in memory buffers.

The processing applied in digital front end 310 can also include other operations not shown in FIG. 3. For example, in some configurations, the DFE 310 can apply the halo correction process described in commonly-assigned U.S. Pat. No. 9,147,232 (Kuo) entitled "Reducing halo artifacts in electrophotographic printing systems," which is incorporated herein by reference.

The image data provided by the digital front end 310 is sent to the image processing module 330 for further processing. In order to reduce the time needed to transmit the image data, a compressor processor 325 is typically used to compress the image data using an appropriate compression algorithm. In some cases, different compression algorithms can be applied to different portions of the image data. For example, a lossy compression algorithm (e.g., the well-known JPEG algorithm) can be applied to portions of the image data including image objects, and a lossless compression algorithm can be applied to portions of the image data including binary text and graphics objects. The compressed image values are then transmitted over a data link to the image processing module 330, where they are decompressed using a decompression processor 335 which applies corresponding decompression algorithms to the compressed image data.

A halftone processor 340 is used to apply a halftoning process to the image data. The halftone processor 340 can apply any appropriate halftoning process known in the art. Within the context of the present disclosure, halftoning processes are applied to a continuous-tone image to provide an image having a halftone dot structure appropriate for printing using the printer module 435. The output of the halftoning can be a binary image or a multi-level image. In an exemplary configuration, the halftone processor 340 applies the halftoning process described in commonly assigned U.S. Pat. No. 7,830,569 (Tai et al.), entitled "Multilevel halftone screen and sets thereof," which is incorporated herein by reference. For this halftoning process, a three-dimensional halftone screen is provided that includes a plurality of planes, each corresponding to one or more intensity levels of the input image data. Each plane defines a pattern of output exposure intensity values corresponding to the desired halftone pattern. The halftoned pixel values are multi-level values at the bit depth appropriate for the print engine 370.

The image enhancement processor 345 can apply a variety of image processing operations. For example, an image enhancement processor 345 can be used to apply various image enhancement operations. In some configurations, the image enhancement processor 345 can apply an algorithm that modifies the halftone process in edge regions of the image (see U.S. Pat. No. 7,079,281, entitled "Edge enhancement processor and method with adjustable threshold setting" and U.S. Pat. No. 7,079,287 entitled "Edge enhancement of gray level images" (both to Ng et al.), and both of which are incorporated herein by reference).

The pre-processing system 305 provides the image data 350 to the print engine 370, where it is printed to provide the printed image 450. The pre-processing system 305 can also provide various signals to the print engine 370 to control the timing at which the image data 350 is printed by the print engine 370. For example, the pre-processing system 305 can signal the print engine 370 to start printing when a sufficient number of lines of image data 350 have been processed and buffered to ensure that the pre-processing system 305 will be capable of keeping up with the rate at which the print engine 370 can print the image data 350.

A data interface 405 in the print engine 370 receives the data from the pre-processing system 305. The data interface 405 can use any type of communication protocol known in the art, such as standard Ethernet network connections. A printer module controller 430 controls the printer module 435 in accordance with the received image data 350. In an exemplary configuration, the printer module 435 can be the printer 100 of FIG. 1, which includes a plurality of individual electrophotographic printing subsystems 31, 32, 33, 34, 35 for each of the color channels. For example, the printer module controller 430 can provide appropriate control signals to activate light sources in the exposure subsystem 220 (FIG. 2) to expose the photoreceptor 206 with an exposure pattern. In some configurations, the printer module controller 430 can apply various image enhancement operations to the image data. For example, an algorithm can be applied to compensate for various sources of non-uniformity in the printer 100 (e.g., streaks formed in the charging subsystem 210, the exposure subsystem 220, the development station 225 or the fuser module 60). One such compensation algorithm is described in commonly-assigned U.S. Pat. No. 8,824,907 (Kuo et al.), entitled "Electrophotographic printing with column-dependent tonescale adjustment," which is incorporated herein by reference.

In some cases, the printing system can also include an image capture system 440. The image capture system can be used for purposes such as system calibration. The image capture system 440 can use any appropriate image capture technology such as a digital scanner system, or a digital camera system. The image capture system 440 can be integrated into the printing system, or can be a separate system which is in communication with the printing system.

In the configuration of FIG. 3, the pre-processing system 305 is tightly coupled to the print engine 370 in that it supplies image data 350 in a state which is matched to the printer resolution and the halftoning state required for the printer module 435. In other configurations, the print engine can be designed to be adaptive to the characteristics of different pre-processing systems 305 as is described in commonly-assigned, co-pending U.S. patent application Ser. No. 15/135,607 (now U.S. Publication No. 2017/0308774) to Kuo et al., entitled "Print engine with adaptive processing," which is incorporated herein by reference.

Aspects of the present invention will now be described with reference to FIG. 4, which shows a flow chart of processing operations that can be used to apply various calibration and artifact correction processes in accordance with exemplary embodiments. Some of the operations can be applied in data processing electronics 570 before passing the image data to the printer module 435 (e.g., in the printer module controller 430 (FIG. 3)), while other operations can be applied in printhead electronics 580 associated with the exposure subsystem 220 (FIG. 2) of the printer module 435.

The input to the flow chart is a pixel code value 500 for an image pixel in an array of image data to be printed by one of the electrophotographic printing subsystems 31, 32, 33, 34, 35 in the printer 100. In an exemplary embodiment, the pixel code value 500 can be a pixel of the image data 350 that is input to the print engine 370 (see FIG. 3). Typically, the pixel code value 500 will be an 8-bit number between 0-255.

An apply calibration LUT step 510 is used to apply a calibration look-up-table (LUT) 505 to the pixel code value 500. Typically, the output of the calibration LUT will be an exposure value EV which is linear with the exposure level to be provided by the printhead. In an exemplary arrangement, the exposure value EV is represented by a 12-bit integer in the range 0-4095. The exposure value EV corresponds to the exposure that should be provided to the photoreceptor 206 (FIG. 2) by the exposure subsystem 202 such that the printer 100 (FIG. 1) produces an aim density value appropriate for the pixel code value 500.

An apply gain corrections step 520 is used to apply gain correction values 515 on a pixel-by-pixel basis to compensate for various sources of non-uniformity in the printer 100 (e.g., streaks formed in the charging subsystem 210, the exposure subsystem 220, the development station 225 or the fuser module 60). In an exemplary embodiment, the apply gain corrections step 520 applies the compensation algorithm described in the aforementioned U.S. Pat. No. 8,824,907. This method involves determining two gain correction values 515 (i.e., G1 and G2) for each light source in the linear printhead. The output of the apply gain corrections step 520 is a modified exposure value EV'.

While the exposure value EV is a 12-bit number in an exemplary configuration, only 256 of the different code values will be used since the pixel code value 500 is an 8-bit number. The apply gain corrections step 520 will modify the exposure value EV for each light source in a different manner in accordance with the associated gain correction values 515. As a result, the modified exposure values EV' will generally utilize many more of the available 12-bit code values. The exact set of code values that are used will depend on the gain correction values 515 that are necessary to correct for the streak artifacts.

Figure 5:
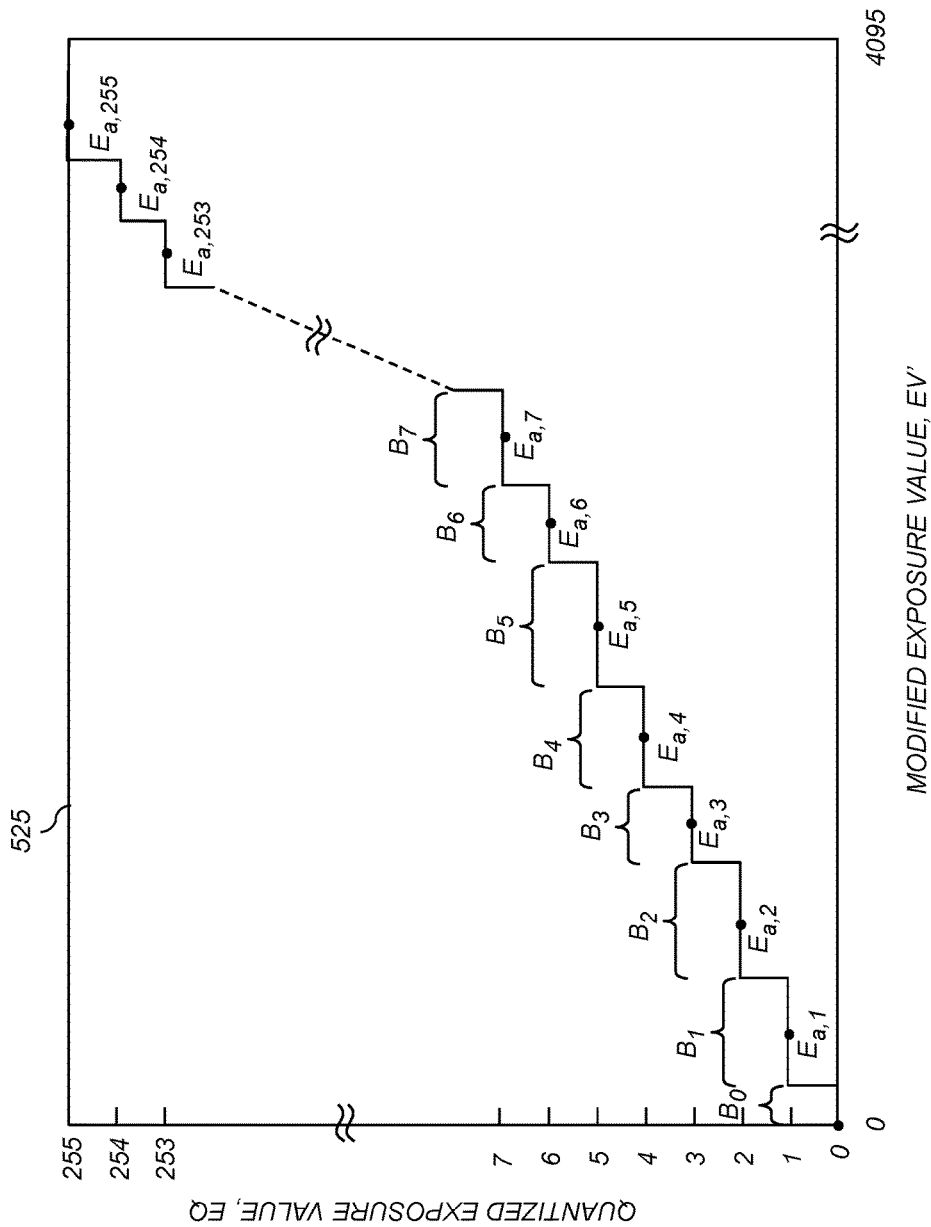
FIG. 5 illustrates an exemplary quantization look-up-table.

The interface to the printhead is typically an 8-bit number. As a result, it is necessary to use an apply quantization step 530 to determine a quantized exposure value 540 by applying an appropriate quantization LUT 525. To minimize quantization errors, a vector quantization process can be used to select the ranges of exposure values which are mapped to each of the quantized exposure values 540. Vector quantization processes are well-known in the art and any appropriate process can be used in accordance with the present invention. An example of a quantization LUT 525 is shown in FIG. 5. The quantization LUT 525 defines a set of bins $B_i$ that correspond to the range of modified exposure values that are mapped to the $i^{th}$ quantized exposure value. An aim exposure value $E_{a,i}$ can also be defined for each bin specifying an aim exposure value that is representative of the $i^{th}$ quantized exposure value. The set of aim exposure values define an aim exposure function 605, which can be represented as a vector $E_a$:

$$E_a = [E_{a,0}, E_{a,1}, \ldots E_{a,i}, \ldots E_{a,255}] \quad (1)$$

Figure 6:
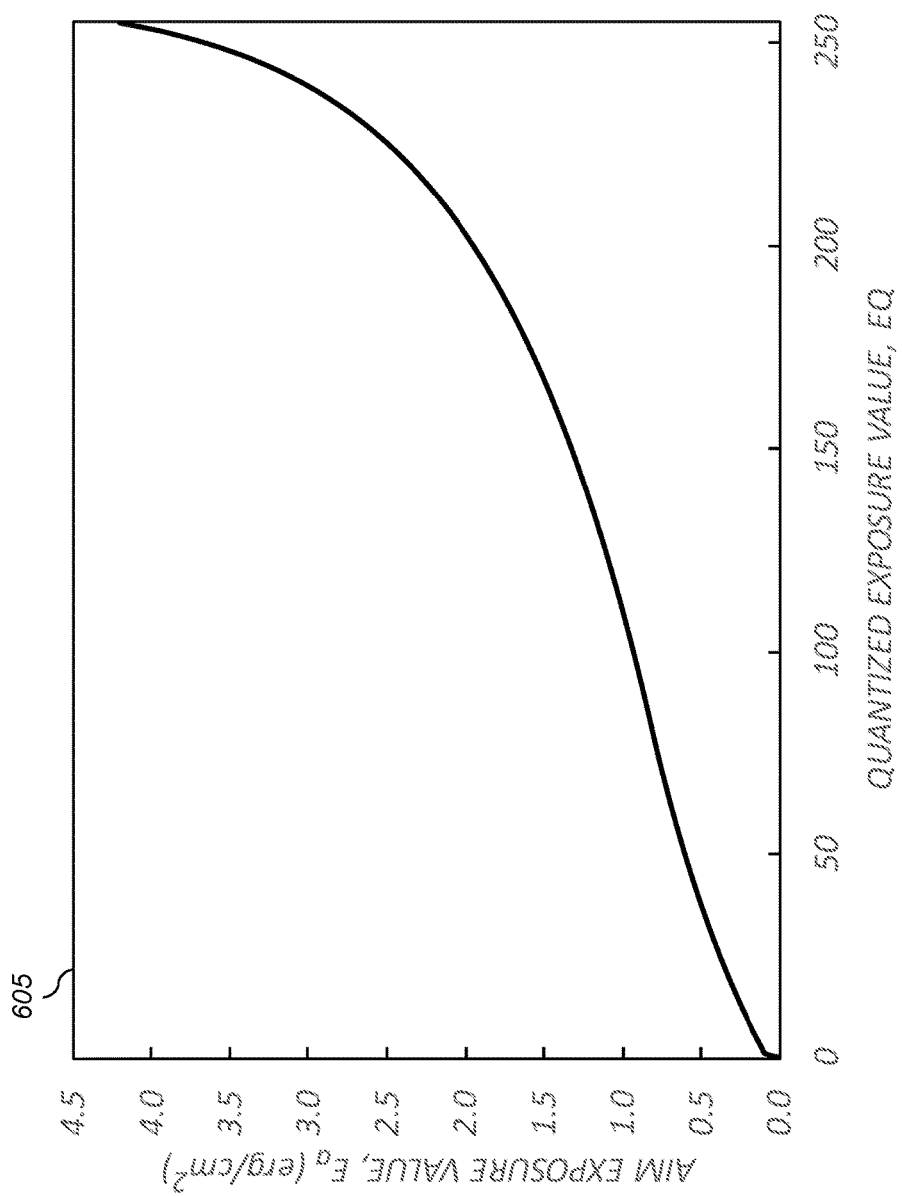
FIG. 6 illustrates an exemplary aim exposure function.

An exemplary aim exposure function 605 is illustrated in FIG. 6.

Over time, it has been found that the characteristics of the streak artifacts can change. It is therefore desirable to perform a calibration process to determine the light-source-dependent gain correction values 515 on a periodic or as needed basis. For example, the calibration process can be performed at the beginning of each day, or can be initiated if an operator observes the presence of streak artifacts. Since the optimal quantization LUT 525 will be a function of the gain correction values 515, it is generally desirable to determine an updated quantization LUT 525 at the same time. In a preferred embodiment, a determine gain corrections process 590 is performed as part of the calibration process to determine the gain correction values 515 for each light source, the quantization LUT 525 and the corresponding aim exposure function 605.

The quantized exposure values 540 are passed to the printhead where they are used to control the exposure provided by the corresponding light sources. In an exemplary embodiment, a control light source exposure time step 550 controls the exposure by activating each light source in the printhead for an exposure time needed to provide the aim exposure value $E_{a,i}$ corresponding to the associated quantized exposure value 540.

Figure 7:
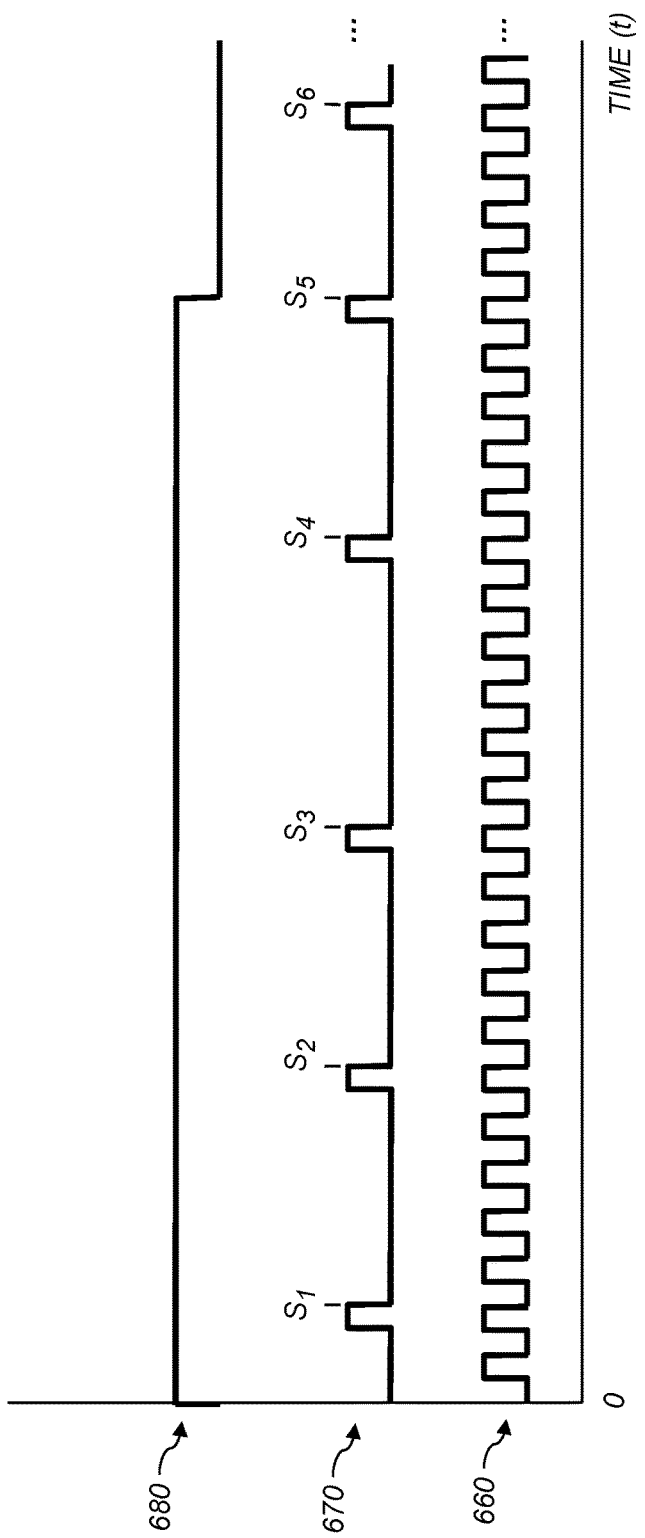
FIG. 7 is a graph illustrating how the master clock signal and the exposure clock signal are used to control the activation of a light source.

In some embodiments, the printhead has an associated master clock which provides a master clock signal 660 as shown in FIG. 7. For example, the master clock can run at 80 MHz. An exposure clock signal 670 is then formed having a stream of pulses formed by counting out a corresponding number of pulses in the master clock signal 660. The exposure can then be controlled by activating the light source at time t=0, and then deactivating the light source after counting a number of exposure clock signal pulses corresponding to the quantized exposure value 540. The time (t) for the $i^{th}$ pulse is given by pulse time $S_i$, The set of pulse times for each of the quantized exposure values together define a pulse timing function 610 (S):

$$S = [S_0, S_1, \ldots S_i, \ldots S_{255}] \quad (2)$$

In an exemplary configuration, the pulse times $S_i$ are represented in terms of the number of master clock pulses. FIG. 7 illustrates a light source activation function 680 corresponding to a quantized exposure value 540 of EQ=5 where the light source is activated at time t=0 and deactivated at time $S_5$ when the falling edge of the $5^{th}$ exposure clock signal pulse is detected.

In the simplest case, the power (i.e., the light output) provided by the light sources is constant during the time that the light source is activated so that the exposure will simply be proportional to the exposure time. However, it has been found that the power provided by the light source typically varies with time (for example, see the exemplary light output function 630 in FIG. 9B). To further complicate matters, the time dependency varies as a function of the pulse times which make up the exposure clock signal 670. For example, for some common driver chips used in LED printhead it has been found that when the pulses in the exposure clock signal 670 are closer together the light output is typically lower than when the pulses in the exposure clock signal 670 are farther apart.

A determine pulse timing function process 600 is used to determine the pulse timing function 610 that will deliver the specified aim exposure function 605. To determine the pulse timing function 610 it is necessary to know the shape of the light output function 630 in order to be able to compute the exposure provided to a particular exposure time. But, as has been discussed, the shape of the light output function 630 depends on the pulse timing function 610. Consequently, it is not possible to determine the pulse timing function 610 using a straightforward process.

Figure 8:
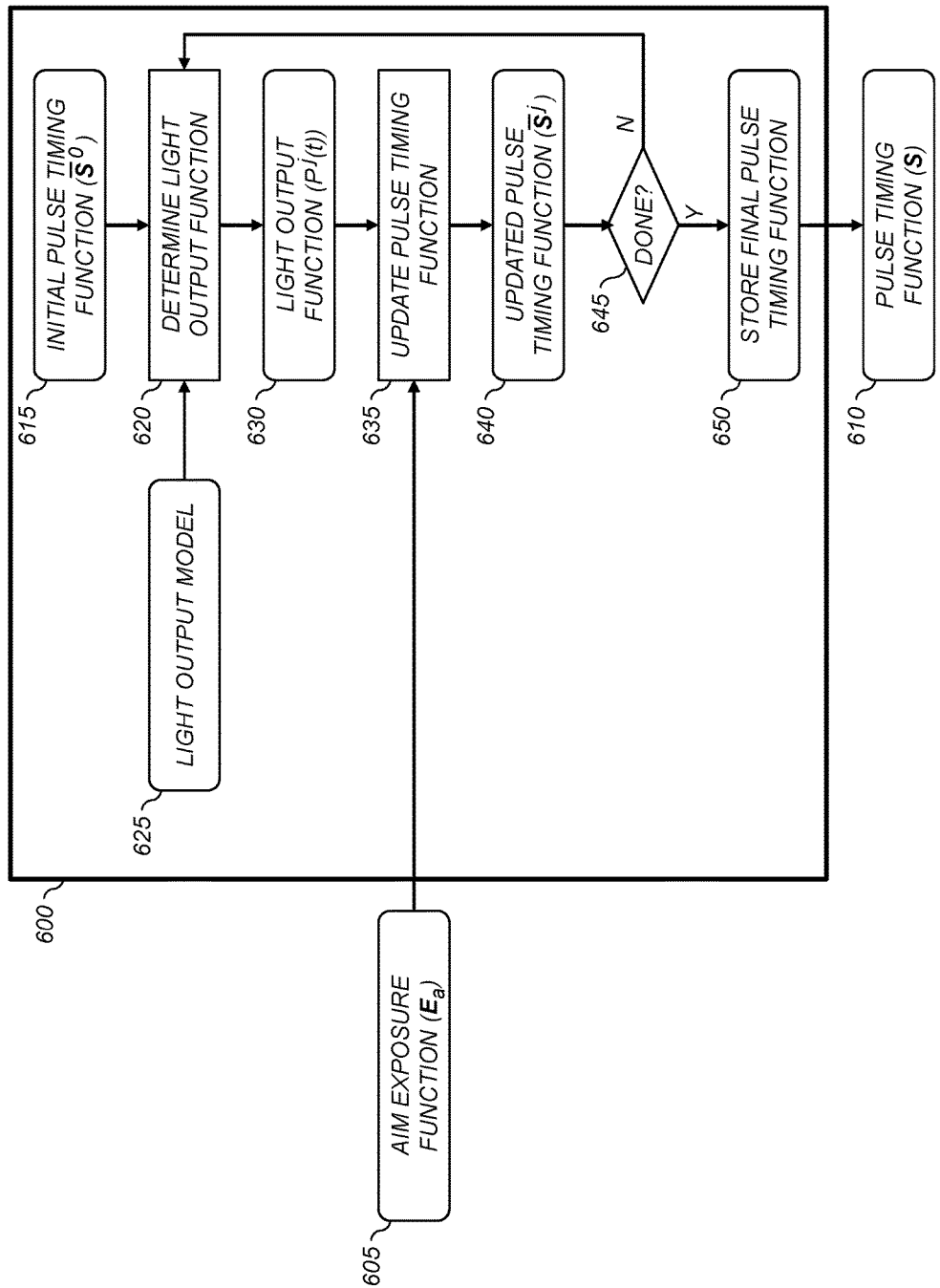
FIG. 8 is a flow chart of an iterative process for determining a pulse timing function in accordance with an exemplary embodiment.

FIG. 8 illustrates an iterative process that has been developed for use by the determine pulse timing function process 600 in accordance with an exemplary embodiment. A determine light output function step 620 is used to determine an initial light output function 630 based on an initial pulse timing function 615 ($S^0$). The initial pulse timing function 615 can be provided in a variety of ways. In some embodiments, it can be a previously determined pulse timing function which was determined for a similar aim exposure function 605. In other embodiments the initial pulse timing function 615 can be determined based on the assumption that the light output function 630 is constant with time.

The determine light output function step 620 can determine the light output function 630 using any appropriate means. In one exemplary configuration, one or more light sources in the printhead can be controlled using the initial pulse timing function 615 and the light output function 630 can be measured using a light detector which measures light output of the one or more light sources as a function of exposure time. In a preferred configuration, the determine light output function step 620 determines the light output function 630 using a light output model 625 which predicts the light output as a function of exposure time given a pulse timing function.

It has been found that the following functional form for the light output model 625 produces good predictions for the normalized light output as a function of exposure time for a common type driver chips for LED printheads (e.g., the model LC46611C drier chip available from ON Semiconductor):

$$P(t) = 1 - \frac{\alpha}{\Delta t_i} = 1 - \frac{\alpha}{(S_{i+1} - S_i)} \tag{3}$$

where $S_i$ is the $i^{th}$ pulse time, $\Delta t_i = (S_{i+1} - S_i)$ is the time difference between two successive exposure clock signal pulses at time t, and $\alpha$ is a constant which can be experimentally determined for the driver chip and operating conditions. A typical value of $\alpha$ would be on the order of 0.01-0.02 msec.

Next, an update pulse timing function step 635 is performed to determine an updated pulse timing function 640 that would provide the exposure values given by the aim exposure function 605 given the determined light output function 630. The updated pulse time $S_i^j$ for the $i^{th}$ quantized exposure value 540 and the $j^{th}$ iteration can be determined by computing the updated pulse time that satisfies the following equation:

$$\hat{E}_{a,i} = \frac{E_{a,i}}{E_{a,255}} = \frac{\int_0^{S_i^j} P^{(j-1)}(t)dt}{\int_0^{S_{255}^j} P^{(j-1)}(t)dt} \tag{4}$$

where $P^{(j-1)}(t)$ is the light output function 630 determined for the previous iteration, $E_{a,i}$ is the aim exposure value for the $i^{th}$ quantized exposure value 540, and $\hat{E}_{a,i}$ is the corresponding normalized aim exposure value. (Note that this approach determines the updated pulse timing function 640 that would provide the exposure values having the same normalized shape the aim exposure function 605. The absolute exposure value can be matched by adjusting the overall current provided to the light sources.) The updated pulse times $S_i^j$ that satisfy this equation can be determined using well-known numerical integration techniques. The updated pulse timing function 640 ($S^j$) for the $j^{th}$ iteration corresponds to the vector of individual pulse times:

$$S^j = [S_0^j, S_1^j, \ldots S_i^j, \ldots S_{255}^j] \tag{5}$$

A done test 645 is used to determine whether or not a predefined iteration termination criterion is satisfied. In one exemplary embodiment, the updated pulse timing function 640 ($S^j$) is compared to the pulse timing function for the previous iteration ($S^{(j-1)}$) to determine whether the results have converged. For example, the iteration termination criterion can be evaluated by determining the magnitude of a vector difference between the two pulse timing functions and comparing it to a predefined threshold $\varepsilon_s$:

$$|S^j - S^{(j-1)}| < \varepsilon_s \tag{6}$$

In other variations, rather than determining the magnitude of the vector difference, the maximum difference can be determined for the elements of the vector difference. In this case, if there was a significant difference in the pulse timing for one quantized exposure value, the iterative process would continue even if the total difference was small.

In another embodiment, the iteration termination criterion can include computing a normalized actual exposure function for the current iteration ($\hat{E}^j$) and comparing it to the normalized aim exposure function 605 ($\hat{E}_a$). For example, the iteration termination criterion can be evaluated by determining the magnitude of a vector difference between the exposure functions and comparing it to a predefined threshold $\varepsilon_e$:

$$|\hat{E}^j - \hat{E}_a| < \varepsilon_e \tag{7}$$

where the normalized actual exposure function for the current iteration ($\hat{E}^j$) is determined by integrating the light output function $P^j$ (t) for the current iteration using the corresponding pulse times in the updated pulse timing function ($S^j$):

$$\hat{E}_i^j = \frac{\int_0^{S_i^j} P^j(t)dt}{\int_0^{S_{255}^j} P^j(t)dt} \tag{8}$$

The pulse timing function 610 that provides the specified aim exposure function 605 can be a function of the printer configuration. For example, some printers can be configured to print at a variety of in-track spatial resolutions (e.g., 600 dpi or 1200 dpi). If the overall print speed is maintained to be the same, this means that the 1200 dpi pixels must be printed in half the time as the 600 dpi pixels. As a result, the associated pulse times will nominally be about half as long as well. This will typically have a significant impact on the shape of the light output function 630, and will therefore require that the pulse timing function 610 be reoptimized accordingly. Therefore, in such cases, it can be necessary to apply the method of FIG. 8 to determine an appropriate pulse timing function 610 for each of the relevant printer configurations. Each of the resulting pulse timing functions 610 can be stored and used when the printer is used in the corresponding configuration.

If the done test 645 determines that the iteration termination criterion has been satisfied, a store final pulse timing function step 650 is used to store the results of the final iteration as the pulse timing function 610 (S) in a processor accessible memory for use in controlling the printhead to print image data. Otherwise, another iteration is performed by applying the determine light output function step 620 and the update pulse timing functions step 635 again. It has been found that the process typically converges in 10-200 iterations.

Figure 9B:
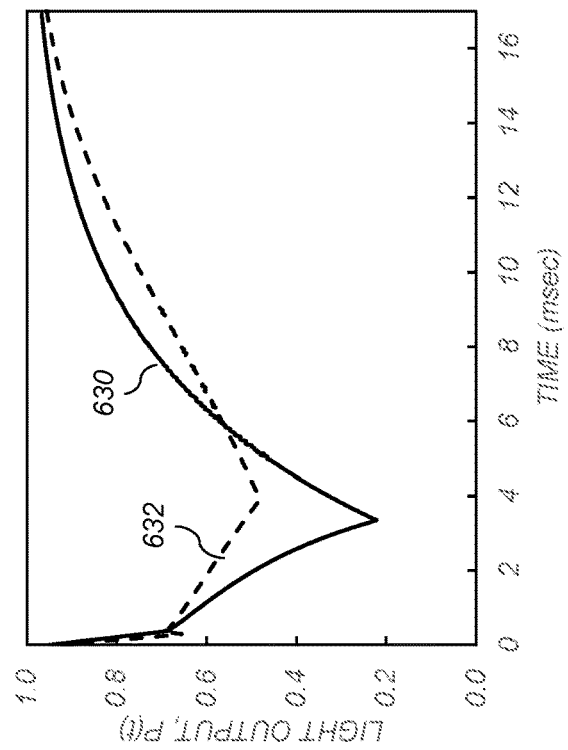
FIG. 9B compares an initial light output function and an updated light timing function corresponding to the pulse timing functions of FIG. 9A.
Figure 9A:
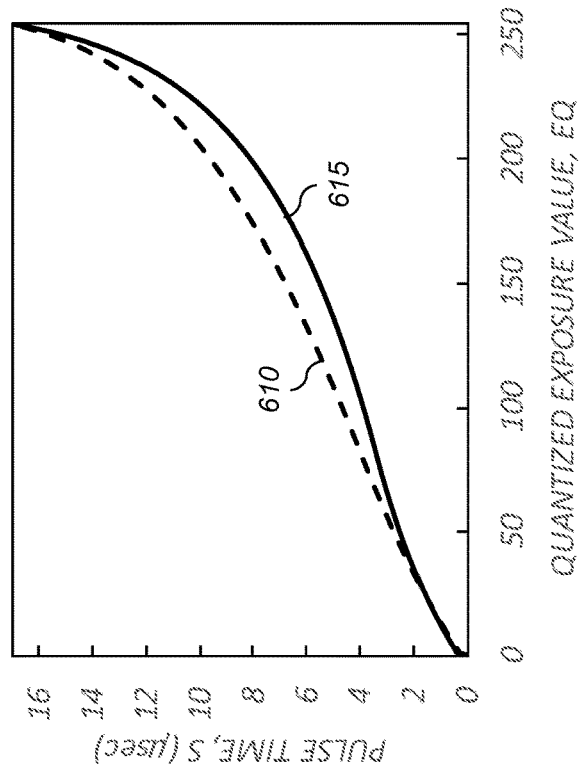
FIG. 9A compares an initial pulse timing function and an updated pulse timing function.

FIG. 9A shows an example of an initial pulse timing function 615. The corresponding initial light output function 630 is shown in FIG. 9B. The determine pulse timing function process 600 of FIG. 8 was applied using this initial pulse timing function 615 to determine the updated pulse timing function 610 shown in FIG. 9A that will provide the aim exposure function 605 of FIG. 6. The corresponding optimized light output function 632 is shown in FIG. 9B. It can be seen that the optimized light output function 632 is quite different than the initial light output function 630. This demonstrates the dependency of the light output function on the shape of the pulse timing function.

Figure 4:
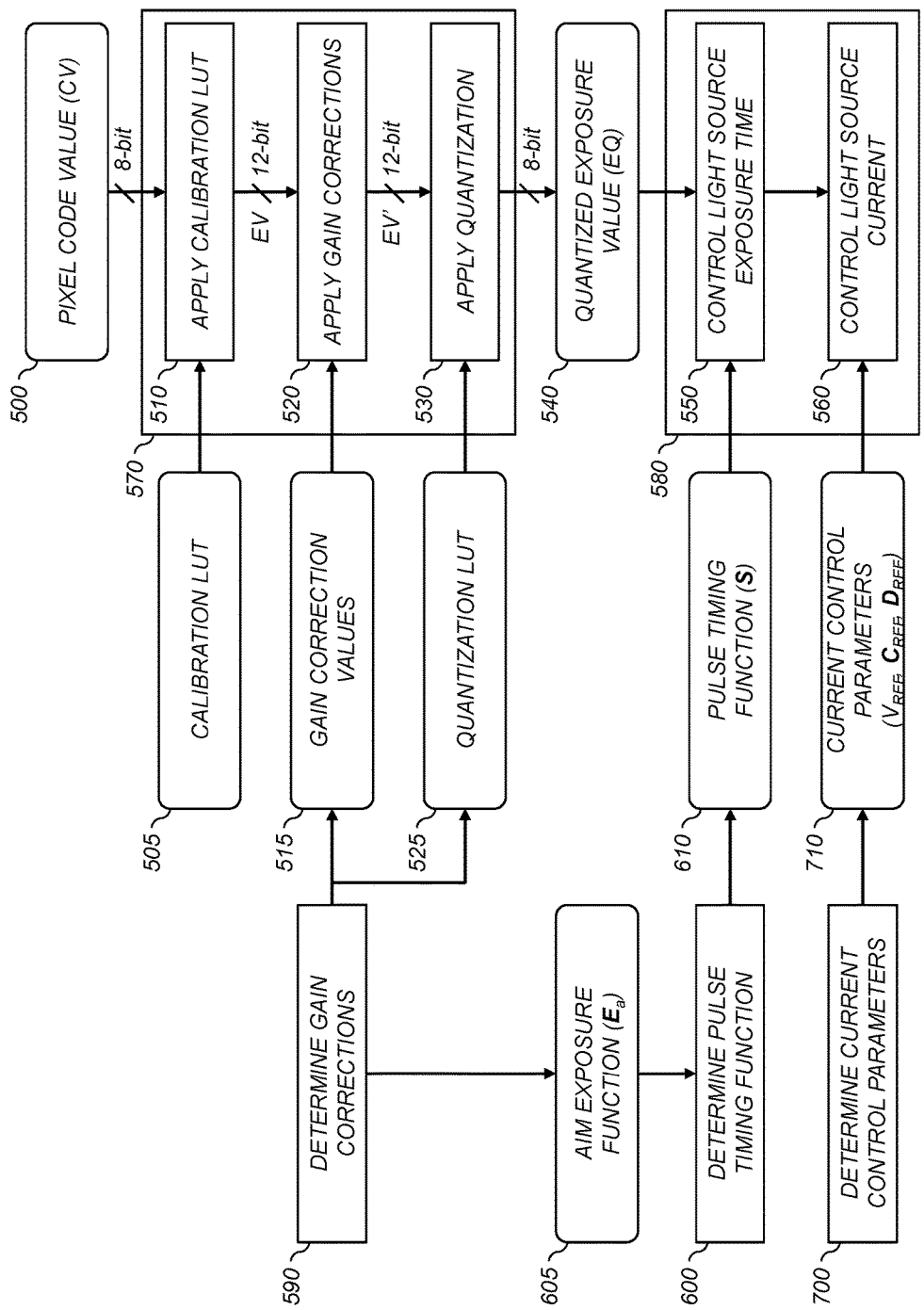
FIG. 4 is a flow chart showing processing operations that are used to apply various calibration and artifact correction processes in accordance with exemplary embodiments.

Returning to a discussion of FIG. 4, the pulse timing function 610 determined by the determined pulse timing function process 600 is used by a control light source exposure time step 550, which is applied in the printhead electronics 580 to control how long each of the individual light sources in the printhead is activated in response to the corresponding quantized exposure value 540.

In an exemplary embodiment, the same pulse timing function 610 is used for all of the light sources in the linear printhead. However, there will generally be differences between the light output of the different light sources when they are operated at the same current. This can result in various artifacts in the printed images such as streaks. To compensate for these artifacts, the current supplied to each light source can be adjusted using a control light source current step 550 to equalize the light output of the light sources. A calibration operation including a determine current control parameters process 700 can be performed to determine a set of current control parameters 710 that are used by the control light source current step 560 to control the current for each light source.

In some embodiments, the determine current control parameters process 700 can determine the current control parameters 710 by placing the printhead into a test fixture that includes a light sensor and measuring the light output for each light source. In this way, the current supplied to each light source can be adjusted until the light output from each light source is equalized to within a predefined tolerance.

In an exemplary embodiment, a plurality of driver chips is used to control the light sources in the printhead, wherein each driver chip controls an associated set of light sources. For example, a printhead in an exemplary printing system includes a linear array of 17,280 light sources that are controlled by 90 driver chips, where each driver chip controls 17,280/90=192 light sources. In this case, the printhead is divided into 45 segments along its length. Within each segment one driver chip controls the odd-numbered light sources, and a second driver chip controls the even-numbered light sources.

In an exemplary configuration, the current control parameters 710 include a global current control value ($V_{REF}$), a set of chip-dependent current control values ($C_{REF}$), and a set of source-dependent current control values ($D_{REF}$). The global current control value ($V_{REF}$) is a parameter which sets an overall current level $I_G$ which is supplied to all of the light sources in the printhead.

The chip-dependent current control values ($C_{REF}$) can be represented by an array of control values (one for each driver chip) that are used to independently adjust the current provided by each of the driver chips:

$$C_{REF} = [C_1, C_2, \ldots C_m, \ldots C_M] \tag{9}$$

where M is the number of driver chips, and $C_m$ is the chip-dependent current control value for the $m^{th}$ driver chip. In an exemplary configuration, each $C_m$ value is a 4-bit integer ranging from 0-15 that specifies a gain adjustment in 3% increments. In this case, the chip-dependent gain adjustment can be expressed as $G_{c,m} = 0.03 \times (C_m - 7)$.

The source-dependent current control values ($D_{REF}$) can be represented by an array of control values (one for each light source) that are used to independently adjust the current provided by each of the light sources:

$$D_{REF} = [D_1, D_2, \ldots D_n, \ldots D_N] \tag{10}$$

where N is the number of light sources, and $D_n$ is the source-dependent current control value for the $n^{th}$ light source. In an exemplary configuration, each $D_n$ value is a 6-bit integer ranging from 0-63 that specifies a gain adjustment in 1% increments. In this case, the source-dependent gain adjustment can be expressed as $G_{d,n} = 0.01 \times (D_n - 31)$.

The current supplied to each light source will be the global current as modified by the chip-dependent gain adjustment and the source-dependent gain adjustment. In equation form, the current supplied to the $n^{th}$ light source that is controlled by the $m^{th}$ driver chip is given by:

$$I_n = I_G(1 + G_{c,m} + G_{d,n}) = I_G(1 + 0.03 \times (C_m - 7) + 0.01 \times (D_n - 31)) \tag{11}$$

Figure 10:
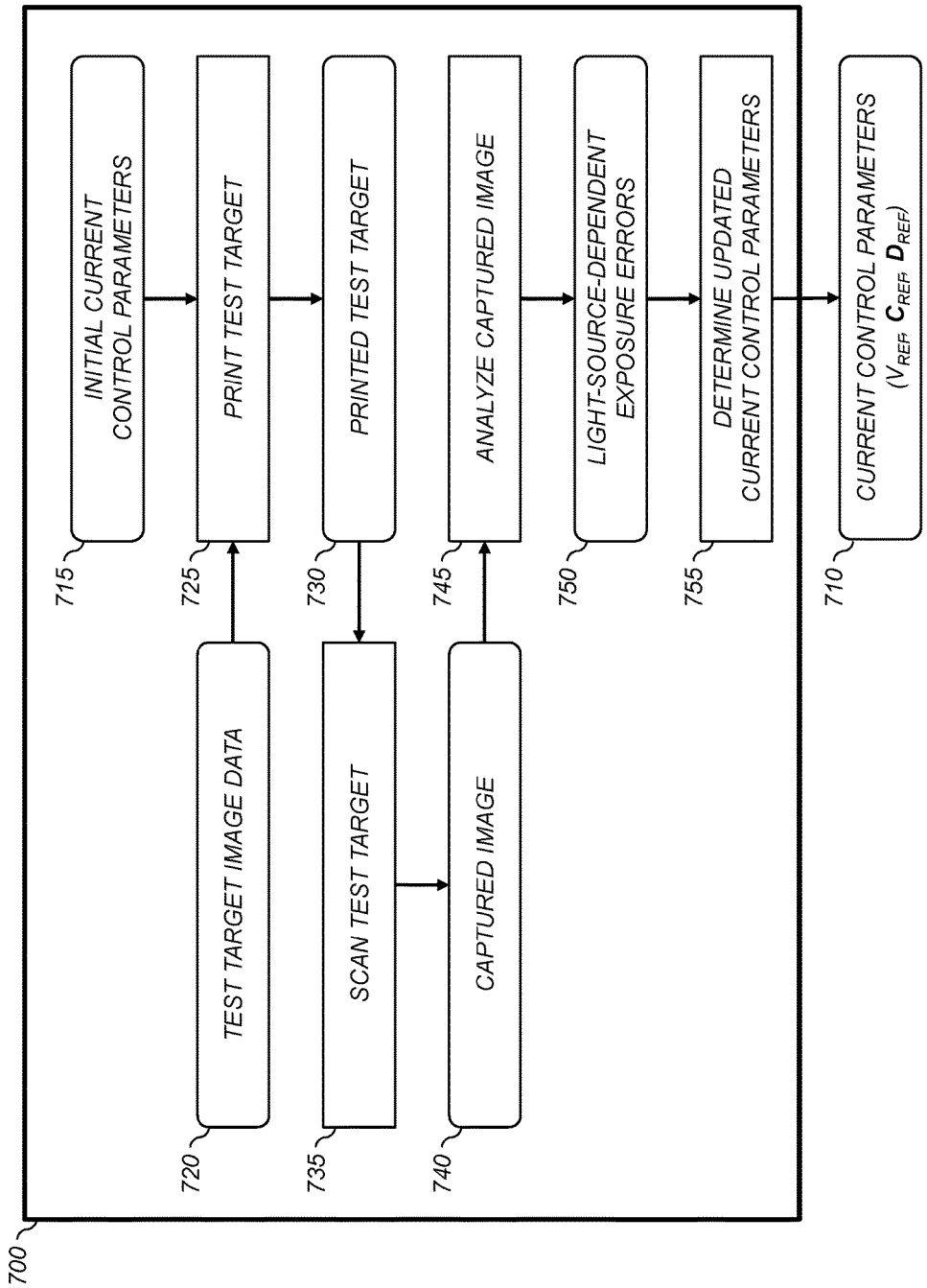
FIG. 10 is a flow chart of a process for determining current control parameters in accordance with an exemplary embodiment.

FIG. 10 illustrate a flowchart of an exemplary embodiment of a determine current control parameters process 700 which determines the current control parameters 710 based on the analysis of a printed test target. In this process, the printhead is configured to use a set of initial current control parameters 715. The initial current control parameters 715 can be obtained in a variety of ways. For example, they can be a set of current control parameters determined using a test fixture that includes a light sensor and measures the light output for each light source as discussed earlier. Alternately, they can be a set of current control parameters determined using a previous calibration process.

Figure 11:
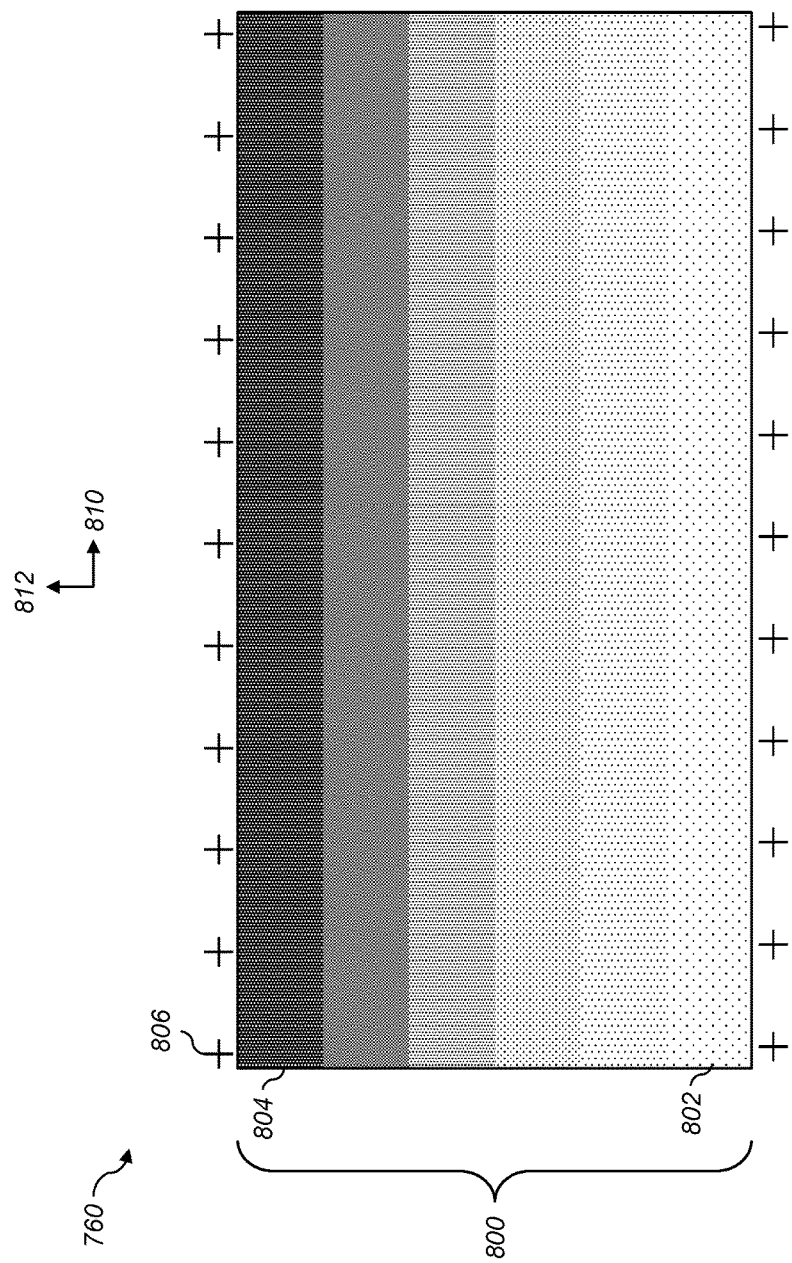
FIG. 11 shows an exemplary test target for use with the process of FIG. 10.

A print test target step 725 is used to print test target image data 720 for a test target 760 including one or more uniform patches. FIG. 11 illustrates an exemplary test target 760 that can be used in an exemplary embodiment. The test target 760 includes a set of uniform patches 800, which span the width of the printhead in the cross-track direction 810. Each uniform patch 800 is positioned at a different in-track position in the in-track direction 812. Each of the uniform patches 800 has a different density level ranging from a lighted uniform patch 802 to a darkest uniform patch 804. The test target 760 also includes a set of alignment marks 806 having known positions relative to the printhead that can be used to determine the alignment of the printed test target to the printhead.

Generally, continuous tone digital image data for the test target 760 is processed through a halftoning process before it is printed to provide halftoned image data. In an exemplary embodiment, the halftoning process is a stochastic halftoning process. The use of a stochastic halftoning process is advantageous because its characteristics are more isotropic and less prone to moiré artifacts during the image capture process. The halftoned image data is then printed using the process of FIG. 4. Preferably, during the process of determining the current control parameters 710, the gain correction values 515 are all set to unity values so that no gain corrections are applied by the apply gain corrections step 520.

The printed test target 730 produced by the print test target step 725 is next digitized using a scan test target step 735. The scan test target image step 735 uses a digital image capture system 440 (FIG. 3) to provide a captured image 749 of the printed test target 730. In a preferred embodiment, the digital image capture system 440 is a digital camera system or an optical scanner system that is integrated into the digital printing system. In some configurations the digital image capture system 440 is used to automatically capture the image of the printed test target 730 as it travels through the digital printing system.

Figure 12:
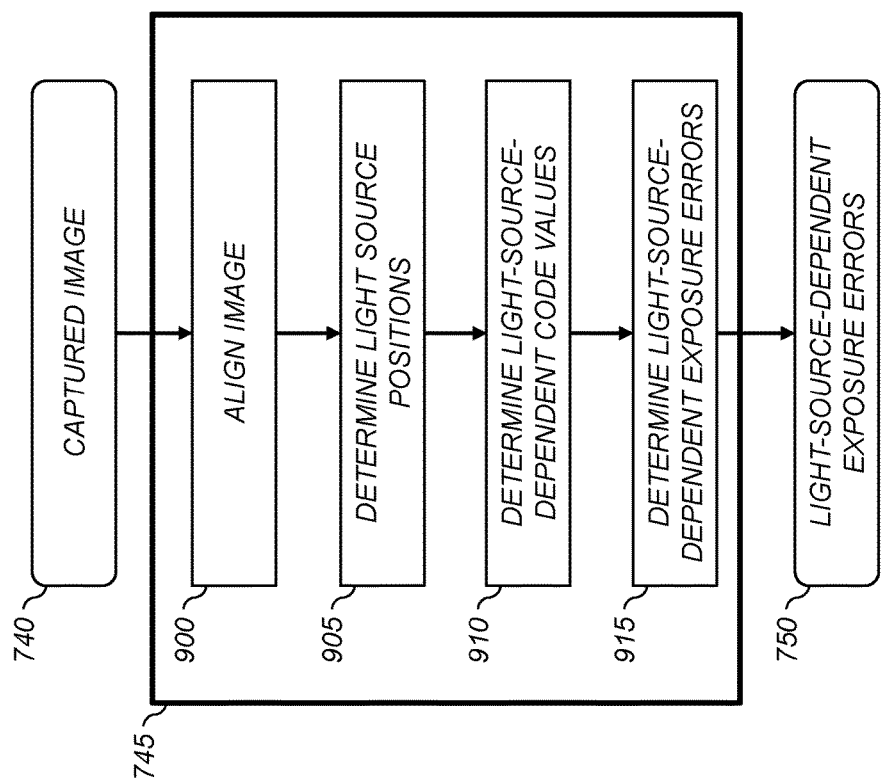
FIG. 12 is a flow chart showing additional details of the analyze captured image step of FIG. 10.

An analyze captured image step 745 is next used to analyze the captured image 740 to determine estimated light-source-dependent exposure errors 750. FIG. 12 shows a flowchart for an exemplary process that can be used to perform the analyze captured image step 745. First, an align image step 900 is used to detect the locations of the alignment marks 806 (FIG. 11) and remove any skew from the captured image 740. A determine light source positions step 905 determines a cross-track position of each light source within the image based on the detected locations of the alignment marks 806.

Figure 13:
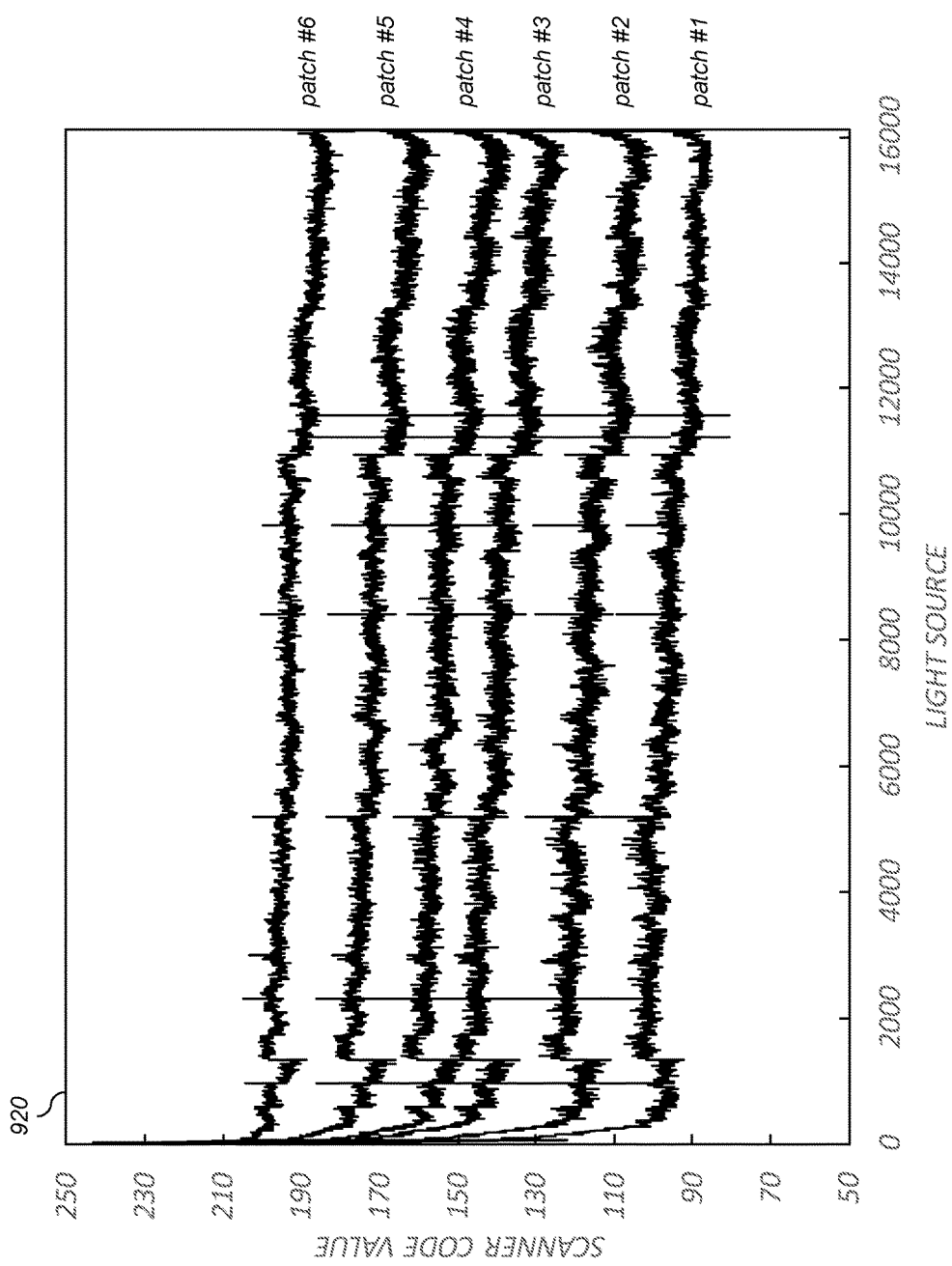
FIG. 13 shows an exemplary set of measured test patch data.

A determine light-source-dependent code values step 910 is then used to determine an average code value within each uniform patch 800 for each light source. This is done by averaging the code values in a vertical column within the uniform patch at the determined cross-track position for the light source. FIG. 13 shows a graph 920 illustrating a sample set of curves showing the scanner code value as a function of light source for a set of six uniform patches. (Note that a set of light sources on either end of the head were outside the active printing area of the printing system so that the number of light sources in the graph 920 is less than the total number of light sources in the printhead.)

Figure 14:
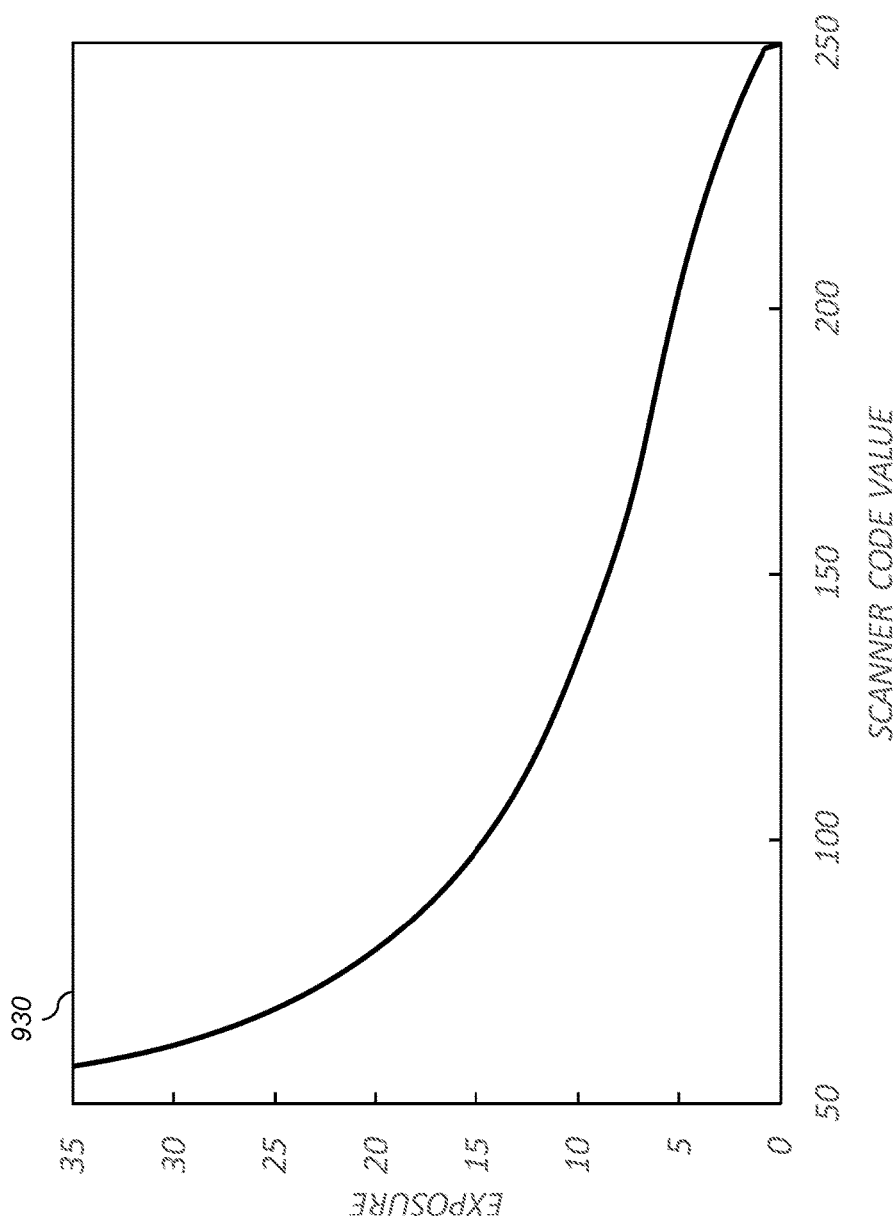
FIG. 14 shows an exemplary calibration function relating scanner code values to estimated exposure values.

Returning to a discussion of FIG. 12, a determine light-source-dependent exposure errors step 915 is then used to determine corresponding estimated light-source-dependent exposure errors 750. In an exemplary embodiment, the digitized scanner code values are mapped to exposure values by applying a calibration curve 930 such as that shown in FIG. 14. The calibration curve 930 can be determined by printing patches having known exposures and measuring the resulting code values in a scanned image. Note that the "exposure" values in FIG. 14 and subsequent plots are the exposure times that the light source is activated in units of microseconds. These values will be proportional to the actual exposure, which can be determined by multiplying these values by the power of the light source (which is about 180 picowatts).

Figure 15:
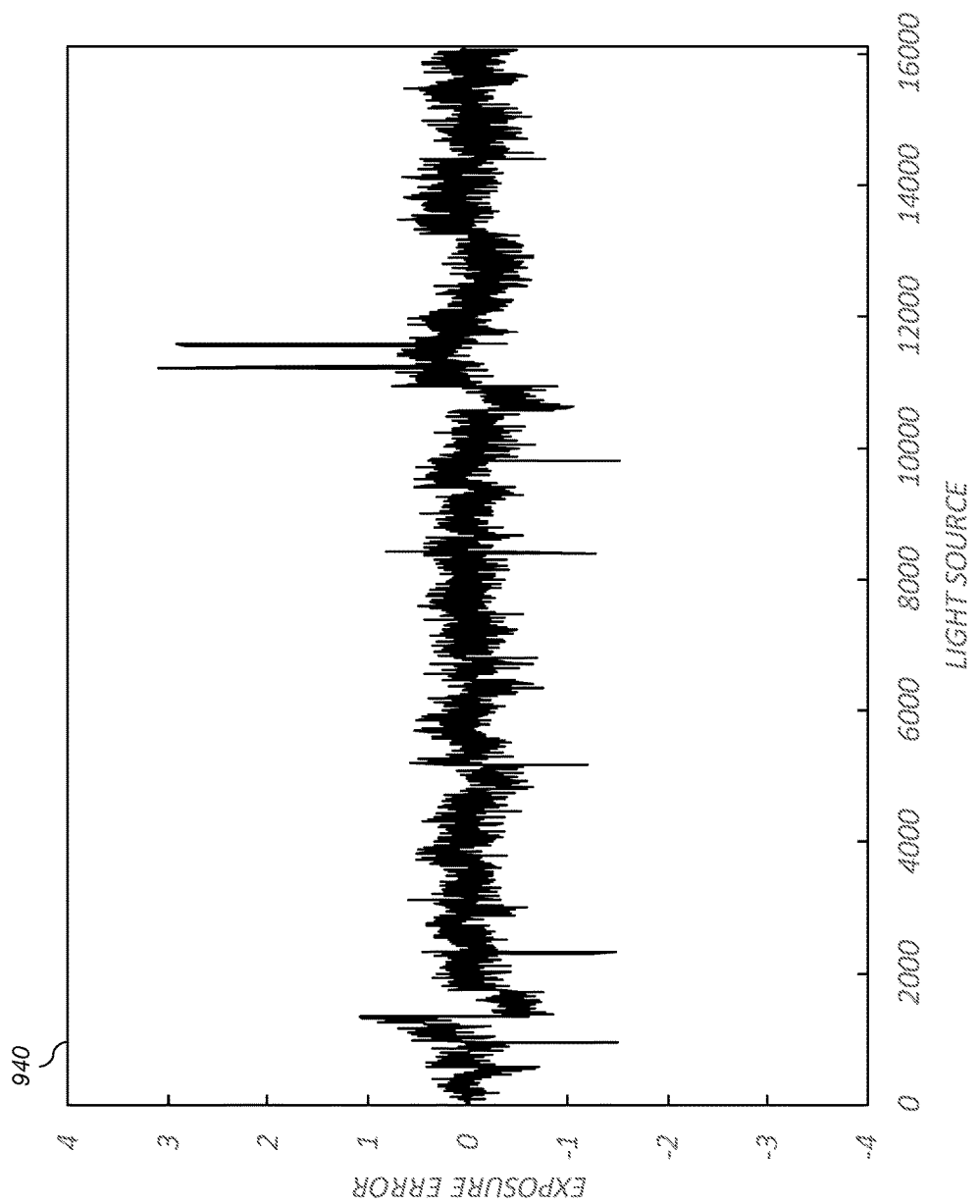
FIG. 15 a graph showing the estimated exposure error as a function of light source for a particular test patch.

To evaluate the exposure errors, the measured exposure values vs. light source functions can be smoothed (e.g., by fitting a spline function) to determine a set of smoothed exposure values. The difference between the smoothed and unsmoothed functions will be an estimate of the exposure errors for each of the light sources. FIG. 15 shows a graph 940 showing the estimated exposure error as a function of light source for one of the uniform patches 800 (FIG. 11).

Figure 16:
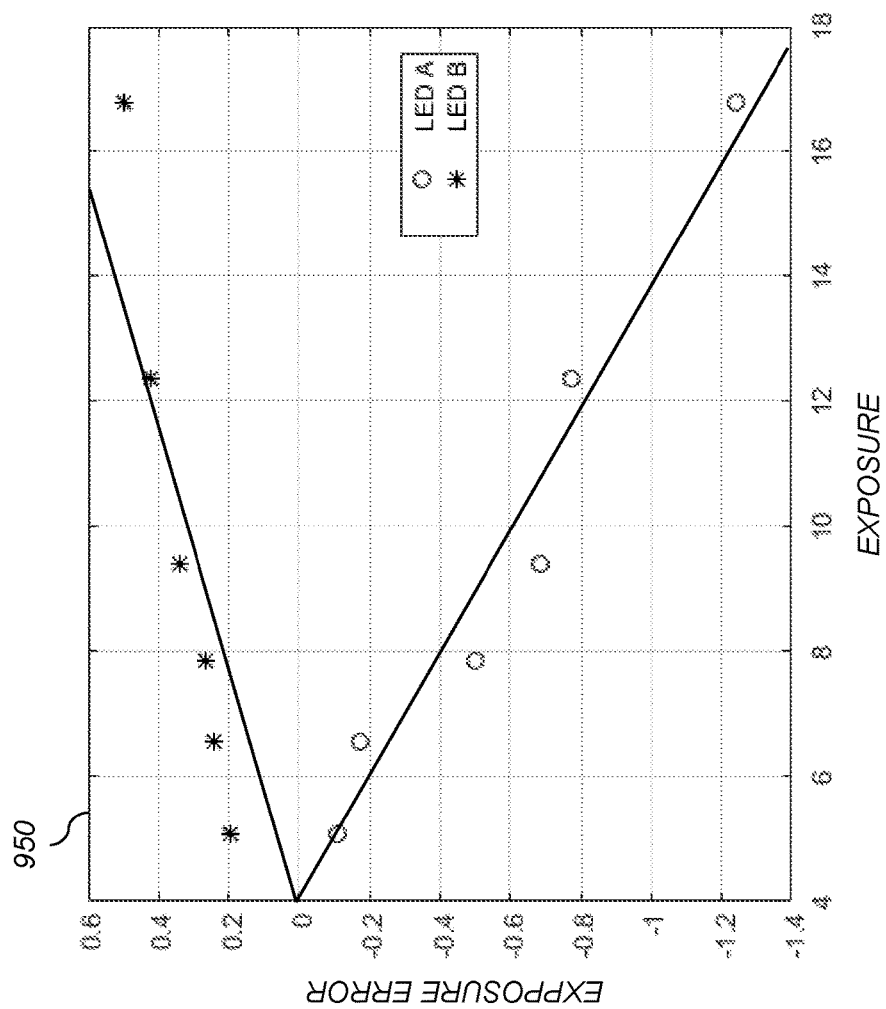
FIG. 16 is a graph showing the estimated exposure error for a particular light source.

Returning to a discussion of FIG. 10, a determine updated current control parameters step 755 is next used to determine the updated current control parameters 710. In an exemplary embodiment, an exposure gain error is determined for each of the light sources by combining the estimated exposure errors for each of the uniform patches 800. FIG. 16 is a graph 950 showing the estimated exposure error determined from the six uniform patches 800 (FIG. 11) for two of the light sources. A linear function can be fit to the points for each light source to provide an estimated gain error. In a preferred embodiment, the linear function is constrained to go through the origin, and the slope of the resulting linear function is therefore an estimate of the exposure gain error. A positive slope indicates that the light source is providing too much exposure and a negative slope is an indication that the light source is providing too little exposure.

Figure 17:
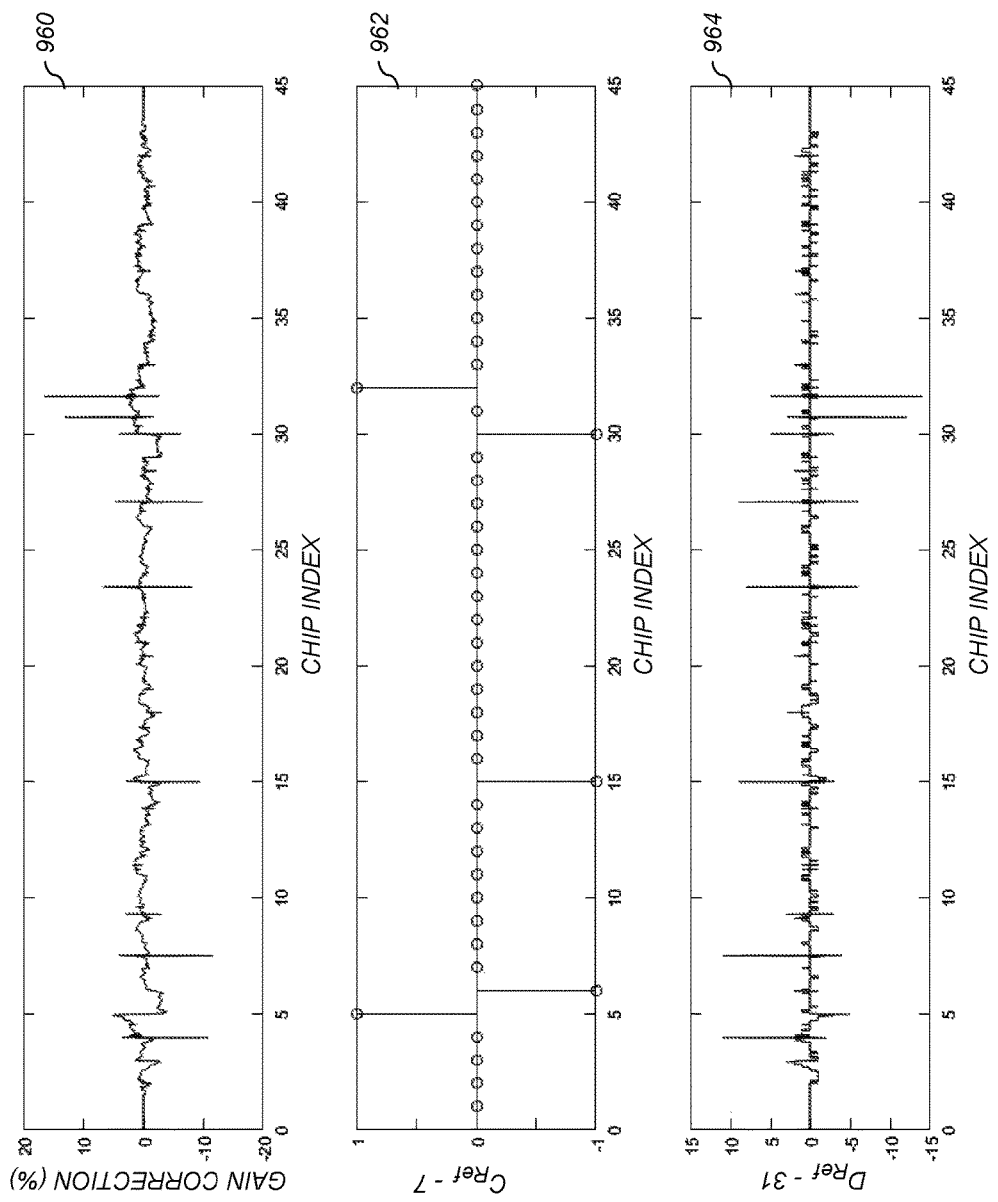
FIG. 17 is a graph illustrating an exemplary set of gain corrections.

FIG. 17 shows a graph 960 illustrating an exemplary set of gain corrections determined for each of the light sources. (In this plot, the x-axis has been scaled to the number of control chips across the printhead.) These gain corrections can then be combined with the gain values associated with the initial current control parameters 715 (FIG. 10) to determine an updated set of gain adjustment values. The updated gain adjustment values are then used to determine a corresponding set of current control parameters 710.

In an exemplary embodiment, the global current control value ($V_{REF}$) is not adjusted during this process, so the same value is used as in the initial current control parameters. Rather, the value of the global current control value ($V_{REF}$) is set to produce the desired maximum exposure level at a quantized exposure value 540 of EQ=255. To determine the set of chip-dependent current control values ($C_{REF}$) for the updated current control parameters 710, the gain adjustment values associated with each of the control chips are averaged and quantized into bins associated with the available chip-dependent current control values ($C_m$). The associated chip-dependent gain adjustment is calculated for each control chip (e.g., using the equation $G_{c,m} = 0.03 \times (C_m - 7)$) and is subtracted from the gain adjustment values to determine residual gain adjustment values. The residual gain adjustment values for each light source are quantized into bins associated with the available source-dependent current control value ($D_n$). The chip-dependent current control values ($C_m$) are used to form the vector of chip-dependent current control values ($C_{REF}$) and the source-dependent current control values ($D_n$) are used to form the source-dependent current control values ($D_{REF}$) for the updated current control parameters 710. A plot of the resulting chip-dependent current control values is shown in graph 962, and a plot of the resulting source-dependent current control values is shown in graph 964.

Once the updated current control parameters 710 are determined, they are stored in a processor-accessible memory for use in printing subsequent digital image data. In some embodiments, the determine current control parameters process 700 of FIG. 10 can be performed iteratively to further refine the gain corrections, where the updated current control parameters 710 are used as the initial current control parameters for the next iteration. For example, the determine current control parameters process 700 can be repeated until the determined light-source-dependent exposure errors 750 are all less than a predefined threshold value.

Returning to a discussion of FIG. 4, in an exemplary embodiment, the determine current control parameters process 700 is performed in the factory to determine a set of current control parameters 710 that are stored in the printing system when it is shipped to a customer. Typically, the determine gain corrections process 590 will be used in the field to correct for any streak artifacts that arise in the printed images (e.g., due to degradation of the printhead or other components such as the charging subsystem 210 or the development subsystem 225). However, the determine current control parameters process 700 can also be performed in the field on an as-needed basis. For example, the determine current control parameters process 700 can be performed when a new printhead is installed or when a service technician observes that performance degradations have occurred. When the determine current control parameters process 700 is performed, the gain correction values 515 and the quantization LUT 525 are typically set to nominal values. After the updated current control parameters 710 are determined, the determine gain corrections process 590 can be performed to correct for any residual errors that may remain.

As was discussed earlier with respect to FIG. 8, it has been found that different pulse timing functions 610 may be needed to provide a defined aim exposure function 605 depending on the printer configuration. In particular, different pulse timing functions 610 will typically be needed for different print modes having different line print times (i.e., the time it takes for the printhead to print a line of image data). The line print time will define the maximum pulse time that can be used for the pulse timing function 610, which will in turn have a significant effect on the light output function 630. The aspects of the print mode that will have a direct impact on the line print time will be the in-track printer resolution (i.e., the number of lines/inch that are printed that are printed in the in-track direction, and the print speed (i.e., the number of pages/minute that are printed). For example, doubling the in-track printer resolution or doubling the print speed will have the effect of reducing the line print time by a factor of 2×.

In an exemplary embodiment, the printing system is adapted to print at a set of different print modes having the following characteristics:

TABLE 1

Exemplary Print Modes

| Print Mode | In-Track Printer Resolution (lines/inch) | Print Speed (pages/minute) | Line Print Time (μsec) |
|---|---|---|---|
| 1 | 1200 | 83 | 21.1 |
| 2 | 1200 | 100 | 17.5 |
| 3 | 600 | 83 | 42.2 |
| 4 | 600 | 100 | 35.0 |
| 5 | 600 | 120 | 29.2 |

Each of these five print modes has a different line print time, and as a result requires a different pulse timing function 610 in order to provide a defined aim exposure function 605.

Figure 18:
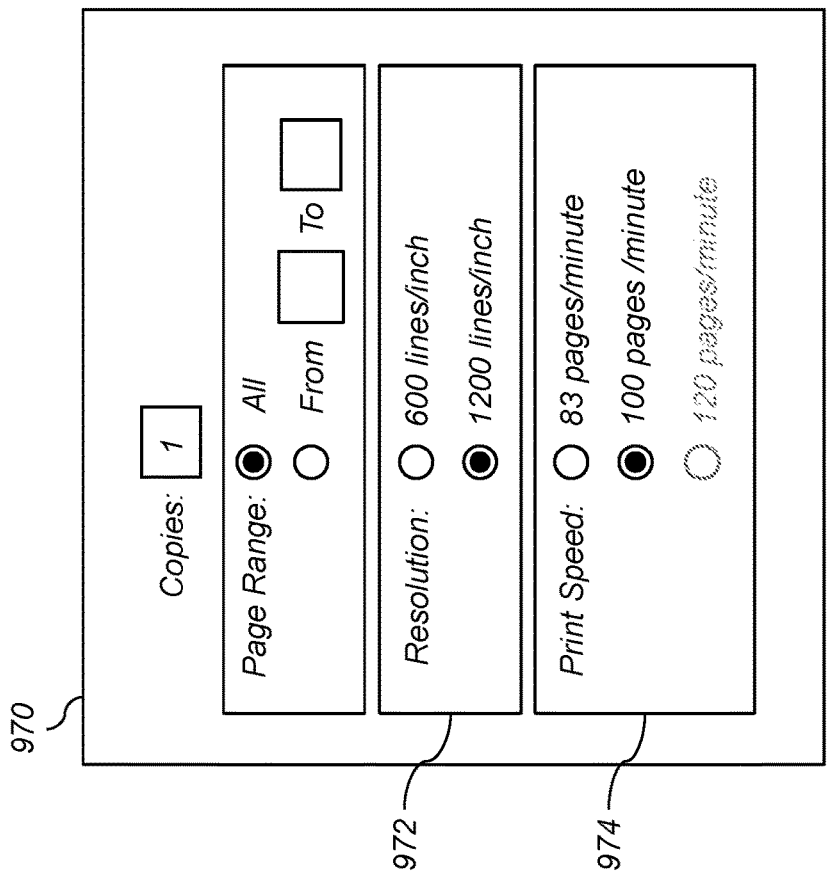
FIG. 18 illustrates an exemplary user interface that enables a user to select options for specifying a print mode.

In some embodiments, a user interface can be provided (e.g., in a pre-processing module 305) that enables a user to select a different print mode on a job-by-job basis. Therefore, in a preferred embodiment, a mechanism is provided to select the appropriate pulse timing function to be used with each print job. For example, FIG. 18 shows an exemplary user interface 970 having user selectable options for specifying aspects of a print mode. In this example, the user selections for specifying the print mode include a resolution selection 972 for selecting an in-track printer resolution and a print speed selection 974 for selecting a print speed. While the resolution selection 972 and the print speed selection 974 are shown with numerical choices, in other embodiments text labels could be used. For example, the 1200 lines/inch printer resolution could be labeled "MaxHD" and the 600 lines/inch printer resolution could be labeled "Classic."

In an exemplary embodiment, only certain combinations of the printer resolution and the print speed may be allowable. For example, if a 1200 lines/inch printer resolution is selected, the print speed choices may be limited to 82 pages/minute or 100 pages/minute so that the 120 pages/minute selection is dimmed out. The user interface 970 can also include other selections for controlling other attributes of the print job (e.g., number of copies to print, pages to print, type of halftoning to be applied, etc.).

Figure 19:
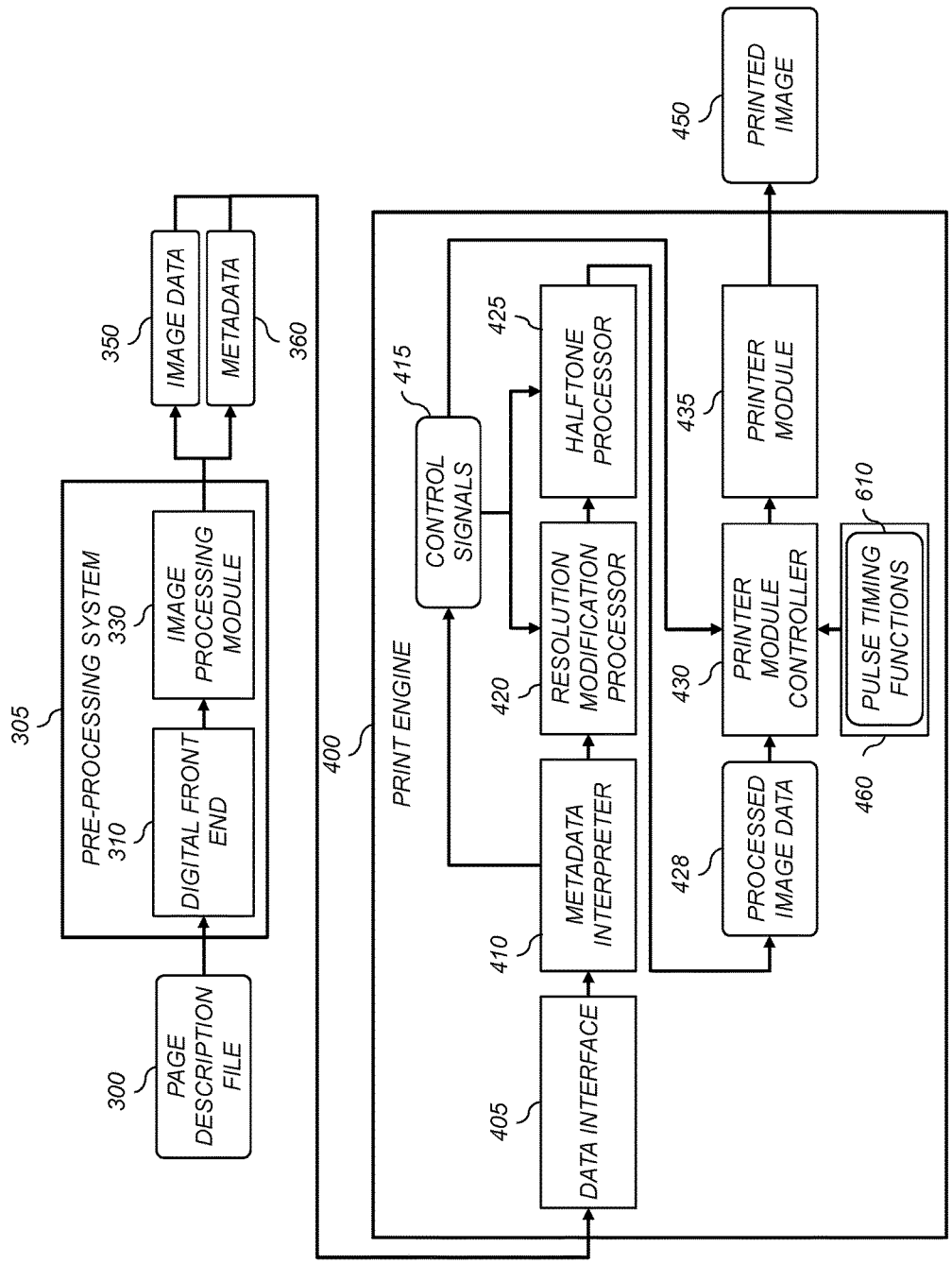
FIG. 19 shows a processing path including an print engine that is adapted to produce printed images from image data using a plurality of print modes.

FIG. 19 shows a processing path including a print engine 400 that is adapted to produce printed images from image data 350 using a plurality of print modes. This processing path represents an extension of that described in the aforementioned U.S. patent application Ser. No. 15/135,607 (now U.S. Publication No. 2017/0308774) to Kuo et al. In this configuration, the pre-processing system 305 provides image data 350 as well as associated metadata 360. In a preferred embodiment, the metadata 360 includes print mode metadata that provides an indication of the print mode that is to be used to print the image data 350. In an exemplary configuration, the print mode metadata can be an integer specifying a print mode from a predefined set of print modes such as those shown in Table 1. In other configurations, the print mode metadata can include various parameters specifying various attributes of the print mode, such as a printer resolution parameter and a print speed parameter that are specified using user interface 970 (FIG. 18). The metadata 360 can also include other parameters such as image resolution metadata and halftoning state metadata.

The print engine 400 receives the image data 350 and the metadata 360 using an appropriate data interface 405 (e.g., an Ethernet interface). The print engine includes a metadata interpreter 410 that analyzes the metadata 360 to provide appropriate control signals 415 that are used to various aspects of the print engine 400. In an exemplary configuration, the control signals include resolution modification control signals that are used to control a resolution modification processor 420 and halftone algorithm control signals that are used to control a halftone processor 425 as described in the aforementioned U.S. patent application Ser. No. 15/135,607 (now U.S. Publication No. 2017/0308774) to Kuo et al. The resolution modification processor 420 and the halftone processor 425 are used to process the image data 350 to provide processed image data 428, which is in an appropriate state to be printed by the printer module 435. A printer module controller 430 then controls the printer module 435 to print the processed image data 428 to produce the printed image 450.

In a preferred embodiment, the control signals 415 include a pulse timing function selection parameter which is used to select a pulse timing function 610 (FIG. 8). The metadata interpreter 410 determines the pulse timing function selection parameter responsive to metadata 360 that specifies the print mode to be used to print the image data 350. In an exemplary configuration, the print mode metadata includes an in-track printer resolution parameter that specifies an in-track printer resolution (e.g., 600 lines/inch or 1200 lines/inch) and a print speed parameter that specifies a print speed (e.g., 83 pages/minute, 100 pages/minute or 120 pages/minute). As illustrated in Table 1, a set of print modes can be defined corresponding to allowable combinations of these parameters, each print mode having an associated line print time. In addition to selecting a pulse timing function 610, the control signals 415 determined from the print mode metadata can also include parameters for controlling other aspects of the printer module 435. For example, the control signals 415 can be used to select a set of current control parameters 710 (FIG. 4) appropriate for the selected print mode, and to adjust the speed of various motors to control the print speed.

Figure 20:
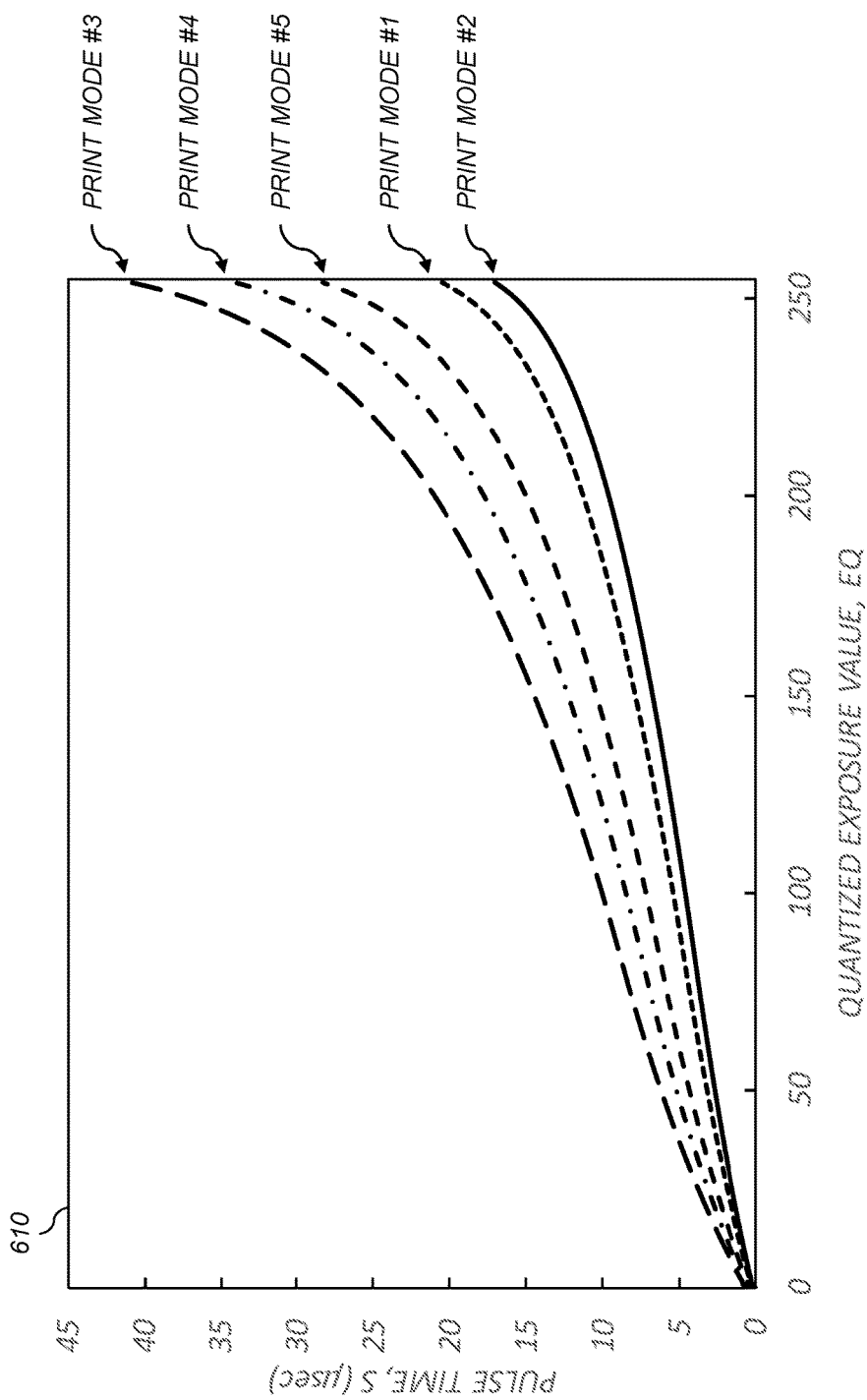
FIG. 20 illustrates an exemplary set of pulse timing functions appropriate for use with different print modes.

The pulse timing functions 610 for each of the print modes are preferably pre-determined using the method of FIG. 8 for the line print times associated with each of the supported print modes and stored in a processor-accessible digital memory 460. FIG. 20 shows an exemplary set of pulse timing functions 610 corresponding to the print modes in Table 1. The pulse timing function selection parameter included in the control signals 415 is used to select the appropriate pulse timing function 610 for the selected print mode, which is then used by the printer module controller 430 to control the printhead in the printer module 435.

The invention has been described in detail with particular reference to certain preferred embodiments thereof, but it will be understood that variations, combinations, and modifications can be effected by a person of ordinary skill in the art within the spirit and scope of the invention.

PARTS LIST

| | |
|---|---|
| 31 | printing module |
| 32 | printing module |
| 33 | printing module |
| 34 | printing module |
| 35 | printing module |
| 38 | print image |
| 39 | fused image |
| 40 | supply unit |
| 42 | receiver |
| 42a | receiver |
| 42b | receiver |
| 50 | transfer subsystem |
| 60 | fuser module |
| 62 | fusing roller |

-continued

PARTS LIST

| | |
|---|---|
| 64 | pressure roller |
| 66 | fusing nip |
| 68 | release fluid application substation |
| 69 | output tray |
| 70 | finisher |
| 81 | transport web |
| 86 | cleaning station |
| 99 | logic and control unit (LCU) |
| 100 | printer |
| 111 | imaging member |
| 112 | intermediate transfer member |
| 113 | transfer backup member |
| 201 | first transfer nip |
| 202 | second transfer nip |
| 206 | photoreceptor |
| 210 | charging subsystem |
| 211 | meter |
| 212 | meter |
| 213 | grid |
| 216 | surface |
| 220 | exposure subsystem |
| 225 | development station |
| 226 | toning shell |
| 227 | magnetic core |
| 240 | power source |
| 300 | page description file |
| 305 | pre-processing system |
| 310 | digital front end (DFE) |
| 315 | raster image processor (RIP) |
| 320 | color transform processor |
| 325 | compression processor |
| 330 | image processing module |
| 335 | decompression processor |
| 340 | halftone processor |
| 345 | image enhancement processor |
| 350 | image data |
| 360 | metadata |
| 400 | print engine |
| 405 | data interface |
| 410 | metadata interpreter |
| 415 | control signals |
| 420 | resolution modification processor |
| 425 | halftone processor |
| 428 | processed image data |
| 430 | printer module controller |
| 435 | printer module |
| 440 | image capture system |
| 450 | printed image |
| 460 | digital memory |
| 500 | pixel code value |
| 505 | calibration LUT |
| 510 | apply calibration LUT step |
| 515 | gain correction values |
| 520 | apply gain corrections step |
| 525 | quantization LUT |
| 530 | quantization step |
| 540 | quantized exposure value |
| 550 | control light source exposure time step |
| 560 | control light source current step |
| 570 | data processing electronics |
| 580 | printhead electronics |
| 590 | determine gain corrections process |
| 600 | determine pulse timing function process |
| 605 | aim exposure function |
| 610 | pulse timing function |
| 615 | initial pulse timing function |
| 620 | determine light output function step |
| 625 | light output model |
| 630 | light output function |
| 632 | optimized light output function |
| 635 | update pulse timing function step |
| 640 | updated pulse timing function |
| 645 | done test |
| 650 | store final pulse timing function |
| 660 | master clock signal |
| 670 | exposure clock signal |
| 680 | light source activation function |

-continued

| PARTS LIST | |
|---|---|
| 700 | determine current control parameters process |
| 710 | current control parameters |
| 715 | initial current control parameters |
| 720 | test target image data |
| 725 | print test target step |
| 730 | printed test target |
| 735 | scan test target step |
| 740 | captured image |
| 745 | analyze captured image step |
| 750 | light-source-dependent exposure errors |
| 755 | determine updated current control parameters step |
| 760 | test target |
| 800 | uniform patch |
| 802 | lightest uniform patch |
| 804 | darkest uniform patch |
| 806 | alignment mark |
| 810 | cross-track direction |
| 812 | in-track direction |
| 900 | align image step |
| 905 | determine light source positions step |
| 910 | determine light-source-dependent code values step |
| 915 | determine light-source-dependent exposure errors step |
| 920 | graph |
| 930 | calibration curve |
| 940 | graph |
| 950 | graph |
| 960 | graph |
| 962 | graph |
| 964 | graph |
| 970 | user interface |
| 972 | resolution selection |
| 974 | print speed selection |

The invention claimed is:

1. A method for controlling a printhead in a digital printing system, the printhead including an array of light sources for exposing a photosensitive medium, comprising:
   a) providing an aim exposure function which gives an aim exposure to be provided by the light sources as a function of an integer pulse count;
   b) providing an initial pulse timing function which defines an exposure time as a function of pulse count;
   c) determining a light output function for the light sources responsive to the pulse timing function, wherein the light output function gives a light output of the light sources as a function of exposure time;
   d) updating the pulse timing function responsive to the light output function and the aim exposure function;
   e) repeating steps c)-d) until a predefined iteration termination criterion is satisfied; and
   f) using the pulse timing function to control the printhead, wherein each light source is activated for a pulse count corresponding to a pixel code value of an associated image pixel.

2. The method of claim 1, wherein the iteration termination criterion is that a difference between the updated pulse timing function and the pulse timing function for a preceding iteration is no more than a predefined threshold.

3. The method of claim 2, wherein the difference between the updated pulse timing function and the pulse timing function for the preceding iteration is a magnitude of a vector difference between a vector representing the updated pulse timing function and a vector representing the pulse timing function for the preceding iteration.

4. The method of claim 1, wherein the iteration termination criterion is that a difference between the aim exposure function and an actual exposure function is no more than a predefined threshold, wherein the actual exposure function is the actual exposure provided by the light sources as a function of pulse count and is determined responsive to the updated pulse timing function and the updated light output function.

5. The method of claim 4, wherein the difference between the aim exposure function and an actual exposure function is a magnitude of a vector difference between a vector representing the aim exposure function and a vector representing the actual exposure function.

6. The method of claim 1, wherein the light output function is determined using a predefined parametric light output model.

7. The method of claim 6, wherein the parametric light output model has the form:

$$P(t) = 1 - \frac{\alpha}{\Delta t_i}$$

where $\Delta t_i$ is the time difference between two successive exposure clock signal pulses at time t, and $\alpha$ is a constant.

8. The method of claim 1, wherein the light output function is determined by controlling one or more light sources in the printhead using the pulse timing function and using a light detector to measure a light output of the one or more light sources as a function of exposure time.

9. The method of claim 1, wherein different pulse timing functions are determined for a plurality of different printer configurations.

10. The method of claim 9, wherein the different printer configurations include a first printer configuration having a first in-track spatial resolution and a second printer configuration having a second in-track spatial resolution.

11. The method of claim 9, wherein the different printer configurations include a first printer configuration having a first print speed and a second printer configuration having a second print speed.

12. The method of claim 1, wherein the aim exposure function is modified in response to a printer calibration process, and wherein a new pulse timing function is determined corresponding to the modified aim exposure function.

13. The method of claim 1, wherein the pulse timing function specifies a number of master clock pulses for which the light source should be activated as a function of the pixel code value.

14. The method of claim 1, wherein an exposure clock signal is formed which includes an exposure clock pulse corresponding to each pixel code value, wherein the pulse timing for each exposure clock pulse is specified by the pulse timing function.

* * * * *